(12) United States Patent (10) Patent No.: US 7,996,669 B2
Pearson et al. (45) Date of Patent: *Aug. 9, 2011

(54) COMPUTER PLATFORMS AND THEIR METHODS OF OPERATION

(75) Inventors: Siani Lynne Pearson, Bristol (GB); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/244,180

(22) Filed: Oct. 2, 2008

(65) Prior Publication Data

US 2009/0031141 A1 Jan. 29, 2009

Related U.S. Application Data

(63) Continuation of application No. 10/049,211, filed on Feb. 5, 2002, now Pat. No. 7,461,249.

(30) Foreign Application Priority Data

Aug. 13, 1999 (EP) ................................... 99306415

(51) Int. Cl.
*G06F 21/02* (2006.01)
*G06F 12/14* (2006.01)
*H04L 9/00* (2006.01)

(52) U.S. Cl. .......... 713/156; 713/175; 713/193; 726/24; 726/27; 705/59

(58) Field of Classification Search ................... None
See application file for complete search history.

(56) References Cited

U.S. PATENT DOCUMENTS

| | | |
|---|---|---|
| 4,918,653 A | 4/1990 | Johri et al. |
| 5,359,659 A | 10/1994 | Rosenthal |
| 5,390,297 A | 2/1995 | Barber et al. |
| 5,473,692 A | 12/1995 | Davis |
| 5,659,616 A | 8/1997 | Sudia |
| 5,724,425 A | 3/1998 | Chang et al. |
| 5,923,884 A | 7/1999 | Peyret et al. |
| 5,949,877 A | 9/1999 | Traw et al. |
| 5,991,399 A | 11/1999 | Graunke et al. |
| 6,092,147 A | 7/2000 | Levy et al. |
| 6,189,097 B1 * | 2/2001 | Tycksen et al. ............... 713/156 |
| 6,189,146 B1 | 2/2001 | Misra et al. |
| 6,266,416 B1 | 7/2001 | Sigbjørnsen et al. |
| 6,343,280 B2 | 1/2002 | Clark |
| 6,363,488 B1 | 3/2002 | Ginter et al. |
| 6,378,072 B1 | 4/2002 | Collins et al. |
| 6,463,474 B1 | 10/2002 | Fuh et al. |
| 6,477,648 B1 | 11/2002 | Schell et al. |
| 6,510,513 B1 | 1/2003 | Danielli |

(Continued)

FOREIGN PATENT DOCUMENTS

EP 1 076 279 A 2/2001

*Primary Examiner* — Christopher A Revak

(57) ABSTRACT

A computer platform (100) uses a tamper-proof component (120), or "trusted module", of a computer platform in conjunction with software, preferably running within the tamper-proof component, that controls the uploading and usage of data on the platform as a generic dongle for that platform. Licensing checks can occur within a trusted environment (in other words, an environment which can be trusted to behave as the user expects); this can be enforced by integrity checking of the uploading and license-checking software. Metering records can be stored in the tamper-proof device and reported back to administrators as required. There can be an associated clearinghouse mechanism to enable registration and payment for data.

6 Claims, 15 Drawing Sheets

U.S. PATENT DOCUMENTS

| | | |
|---|---|---|
| 6,557,105 B1 | 4/2003 | Tardo et al. |
| 6,609,199 B1 | 8/2003 | DeTreville |
| 6,697,948 B1 | 2/2004 | Rabin et al. |
| 6,701,433 B1 | 3/2004 | Schell et al. |
| 6,775,779 B1 | 8/2004 | England et al. |
| 6,820,063 B1 | 11/2004 | England et al. |
| 6,857,067 B2 | 2/2005 | Edelman |
| 7,124,938 B1 | 10/2006 | Marsh |
| 7,203,313 B2 * | 4/2007 | England et al. ............... 380/201 |
| 7,386,513 B2 * | 6/2008 | Lao et al. ....................... 705/51 |
| 7,461,249 B1 * | 12/2008 | Pearson et al. ............... 713/156 |
| 7,529,927 B2 * | 5/2009 | Peinado et al. ............... 713/156 |
| 7,680,743 B2 * | 3/2010 | Peinado et al. ................ 705/59 |
| 7,680,744 B2 * | 3/2010 | Blinn et al. .................... 705/59 |
| 7,720,767 B2 * | 5/2010 | Ta et al. ......................... 705/59 |
| 2003/0005289 A1 | 1/2003 | Gougeon et al. |
| 2003/0041239 A1 | 2/2003 | Shear et al. |
| 2003/0056054 A1 | 3/2003 | Levy et al. |
| 2003/0084306 A1 * | 5/2003 | Abburi et al. ................ 713/188 |
| 2003/0182236 A1 * | 9/2003 | Tanaka et al. .................. 705/51 |
| 2003/0185397 A1 * | 10/2003 | Ishiguro ........................ 380/277 |
| 2003/0185399 A1 * | 10/2003 | Ishiguro ........................ 380/281 |
| 2003/0196085 A1 | 10/2003 | Lampson et al. |
| 2006/0008534 A1 | 4/2006 | Hirai |

* cited by examiner

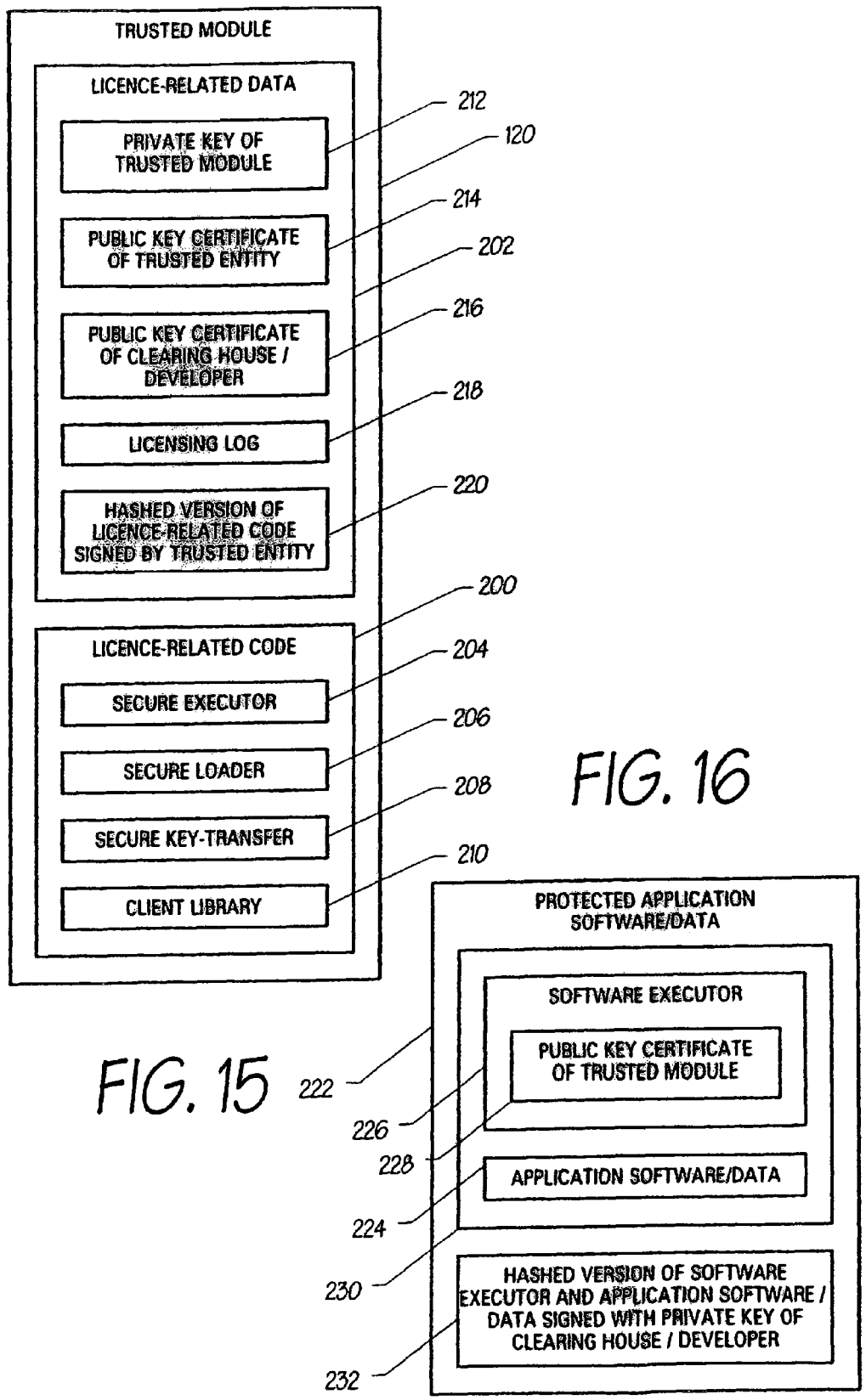

COMPUTER PLATFORMS AND THEIR METHODS OF OPERATION

CROSS REFERENCE TO RELATED APPLICATION

This application is a continuation of U.S. patent application Ser. No. 10/049,211, entitled "COMPUTER PLATFORMS AND THEIR METHODS OF OPERATION," filed Feb. 5, 2002 (issued Dec. 2, 2008, as U.S. Pat. No. 7,461,249 to Pearson, et al.), the disclosure of which is hereby included by reference in its entirety for all purposes.

This invention relates to computer platforms and their methods of operation and is more particularly concerned with controlling and/or metering the installation and/or use of data on computer platforms.

In this specification, 'data' signifies anything that can be formatted digitally, such as images, application software and streaming media. The techniques described in this document can potentially be used to protect or meter many types of information, from simple text documents to audio and video clips, software, graphics, photo- and multimedia materials.

In the future, computer systems will be able to achieve a more secure booting, together with integrity checks on other code to ensure that viruses or other unauthorised modifications have not been made to the operating systems and mounted software. In addition, a new generation of tamper-proof devices are already appearing or will soon appear on the market and include both external or portable components (such as smart cards) and internal components (embedded processors, semi-embedded processors or co-processors with security functionality, i.e. including motherboard, USB and ISA implementations). These tamper-proof components will be used to check that the hardware of the system has not been tampered with, and to provide a more reliable form of machine identity than currently available (for example, the machine's Ethernet name). Yet how to counteract piracy, and how to license and meter software in a manner that is acceptable to software developers and end-users will still be a very important problem.

Software licensing is subject to hackers and piracy, and all the current software licensing methods used have problems associated with them. Software implementations of licensing (such as "license management systems") are flexible, but not especially secure or fast. In particular, they suffer from a lack of security (for example, being subject to a generic "hack") and difficulty in genuine replacement of software. Conversely, hardware implementations ("dongles") are faster and generally more secure than software implementations, but inflexible. They are tailored only for a particular piece of software and are inconvenient for end-users.

The present invention, in its preferred embodiment, seeks to deliver the best of both worlds: a hardware implementation that is secure and fast, but with the convenience and flexibility of a software implementation. Increased security in integrity checking on computer platforms, together with more secure key storage, cryptographic capabilities and more secure identification (and hence authentication) within tamper-resistant hardware are provided in the embodiment of this new, generic concept in software licensing and metering.

A prior patent application (International Patent Application No. PCT/GB00/00528, filed on 15 Feb. 2000) described the use of a Trusted Component to enable verification of the integrity of a computer platform by the reliable measurement and reliable reporting of integrity metrics. This enables the verification of the integrity of a platform by either a local user or a remote entity. That prior patent application described a general method of reporting integrity metrics and verifying the correctness of the integrity of a platform by comparing reported values of metrics with proper values of metrics. The present invention uses license checking code whose integrity is reported using the method of that prior patent application. This prior patent application is incorporated by reference herein.

In overview, the embodiment of the present invention uses a tamper-proof component, or "trusted module" of a computer platform in conjunction with software, preferably running within the tamper-proof component, that controls the uploading and usage of data on the platform as a generic dongle for that platform. Licensing checks can occur within a trusted environment (in other words, an environment which can be trusted to behave as the user expects); this can be enforced by integrity checking of the uploading and license-checking software. Metering records can be stored in the tamper-proof device and reported back to administrators as required. There can be an associated clearinghouse mechanism to enable registration and payment for data.

More formally, in accordance with a first aspect of the present invention, there is provided a computer platform having: a trusted module which is resistant to internal tampering and which stores a third party's public key certificate; means storing license-related code comprising at least one of: a secure executor (which is preferably generic) for checking whether the platform or a user thereof is licensed to use particular data and for providing an interface for using the data and/or for monitoring its usage; and a secure loader (which is preferably generic) for checking whether the platform or a user thereof is licensed to install particular data and/or for checking for data integrity before installation; and means storing a hashed version of the license-related code signed with the third party's private key; wherein the computer platform is programmed so that, upon booting of the platform: the license-related code is integrity checked with reference to the signed version and the public key certificate; and if the integrity check fails, the license-related code is prevented from being loaded. If the integrity check fails, it may be arranged that the complete platform integrity fails.

In the context of this specification, the term "user" includes may mean an end user of the platform, or a system administrator, or both.

The trusted module or component, as described in the prior patent application mentioned above is preferably immune to unauthorised modification or inspection of internal data. It is physical to prevent forgery, tamper-resistant to prevent counterfeiting, and preferably has crypto functions to securely communicate at a distance. Methods of building trusted modules are, per se, well known to those skilled in the art. The trusted module may use cryptographic methods to give itself a cryptographic identity and to provide authenticity, integrity, confidentiality, guard against replay attacks, make digital signatures, and use digital certificates as required. These and other crypto methods and their initialisation are well known to those skilled in the art of security.

Preferably, the integrity checking is performed by: reading and hashing the license-related code to produce a first hash; reading and decrypting the signed version using the public key certificate to produce a second hash; and comparing the first and second hashes.

Preferably, the license-related code also includes secure key-transfer code for enabling a license key to be transferred between the trusted module and a further trusted module of another computer platform. This key transfer code is particularly useful in improving key management when using licensing models that involve an unlock key, that is, where the data is transmitted in an encrypted form and the unlock key is used to allow the protected data to be decrypted and run. The transfer may be carried out by using a public key infrastructure to encrypt a message containing an unlock key, and checking for integrity via hashing and digital signatures. There may be an option to transfer the data itself in this manner, using the secure loader.

Preferably, the license-related code also includes a library of interface subroutines which can be called in order to communicate with the trusted module. The client library is a collection of high-level interface subroutines that applications call to communicate with the trusted module. The client library may also be used by software executors (see below) for communication with the trusted module and operating system ('OS').

The license-related code may include, for at least one group of data, a (or a respective) software executor which specifies the respective group of data and which is operable to act as an interface to that group of data. This allows methods of licensing protection specific to the protected data, and therefore potentially a greater level of protection. If a software executor is associated with an application, optionally it processes queries (API calls) submitted by the application.

Preferably, if space permits, the means storing the license-related code and/or the means storing the hashed version of the license-related code are provided, at least in part, by the trusted module.

Preferably, the trusted module and an operating system of the platform have a dedicated communications path therebetween which is inaccessible to other parts of the computer platform.

Next the way in which these components interact to form a system for general-purpose data, licensing will be considered. There are several stages in which such a system can be constructed, which may be considered as progressing from each other. The first stage is to improve upon current licensing methods such as dongles to make the trusted module act as a generic dongle, governed by generic license-related software (as detailed above) that performs: license checking and is protected against bypassing by integrity checking. Such license-checking software need not run within the trusted module itself. A preferred stage is the logical extension of such a system in which the licensing software runs within the trusted module. A request to load or execute some data will be sent to the trusted module, preferably from the software executor. The licensing software in the trusted module will evaluate such a request and decide whether to allow this, based on details of licensing rights. If the request is to be allowed, this information is conveyed to the OS via a hardware communications path from the trusted module to the CPU. The communications path is preferably inaccessible to ordinary applications and non-OS software. The OS then starts the process to load or execute the data, as appropriate.

Various methods are now considered in which the system components may interact to perform useful licensing functionality. First consideration is given to the way in which the secure loader operates to install data.

In one installation mode: the operating system is operable to request the secure loader to license-check whether the platform or a user thereof (e.g. an end user or a system administrator) is licensed to install that particular data and/or to check the integrity of that data; in response to such a request, the secure loader is operable to perform such a check and respond to the operating system with the result of the check; and in dependence upon the response, the operating system is operable to install or not to install the particular data. This check on the platform or user may be performed by various methods, such as checking for the presence of a private application key or other secret in the trusted module or in a smart card, or checking for the identity and presence of the trusted module or smart card. Such an identity could be made known to the developer, or such a secret could be inserted into the trusted module or smart card during a registration process. This is analogous to the process which will be described later in Example A.

In this mode, preferably the operating system is programmed to install the particular data only in response to the secure loader. Also, in this mode, preferably: the trusted module stores a public key certificate for a party associated with the particular data to be installed; the operating system is operable to include, in the request to check, the particular data together with a hashed version thereof signed with a private key of the associated party; in performing the check, the secure loader is operable: to hash the particular data included in the request to produce a third hash; to decrypt the signed hashed version in the request using the public key certificate for the associated party to produce a fourth hash; and to generate the response in dependence upon whether or not the third and fourth hashes match.

This checks for integrity of the message. The integrity checking mechanism also prevents replay attacks by using a standard mechanism, such as challenge/response, or introducing a history of the communications in the hash. The problem of non-repudiation can be avoided by keeping private keys in tamper proof hardware. Preferably, the request to check includes the software executor for the particular data.

In another installation mode: the software executor (or at least one of the software executors) is operable to request the trusted module to install particular data; in response to such a request, the secure loader within the trusted module is operable to license-check whether the platform or a user thereof is licensed to install that particular data and/or to check the integrity of that data and to respond to the operating system with the result of the check; and in dependence upon the response, the operating system is operable to install or not to install the particular data.

The check may be carried out in a similar fashion to that described above in relation to said one installation mode.

In this other mode, preferably the operating system is programmed to install the particular data only in response to the trusted module. Also, in this mode, preferably the response from the trusted module to the operating system is supplied via the dedicated communications path, as described above.

With either of these installation modes, if the check succeeds, the trusted module is preferably operable to generate a log for auditing the particular data. Also, if the check succeeds, the secure loader is preferably operable to perform a virus check on the particular data.

Upon installation, the particular data may be installed into the trusted platform. Alternatively, the platform may include a further, removable, trusted module (such as a smart card) and be operable to perform an authentication check between the first-mentioned trusted module and the removable trusted module, in which case, upon installation, the particular data may be installed into the further trusted module.

The software executor may itself be protected via integrity checks, carried out by the secure loader. For example, this procedure may work as follows:

(a) The software executor is customised such that the public key corresponding to the client's trusted module is included within it.

(b) The data, associated with a customised software executor, is sent to the client.

(c) Both the data and the software executor are hashed and signed with the clearinghouse/developer's private key, and this is sent in conjunction with the data and software executor.

(d) The secure loader integrity checks the software executor when it is received—upon installation of the software executor, the package is verified by hashing and comparison with the decrypted signature (using the public key in the trusted module). The software executor is not loaded if the digital signature does not match what is expected, and in this case the secure loader signals an error. The secure loader also integrity checks the data itself, using the same procedure.

Now, consideration is given to the way in which the secure executor operates to use data.

In a first execution mode: the software executor (or at least one of the software executors) contains a public key of the trusted module and a licensing model for the respective data; the operating system is operable to request that software executor that its respective data be used; in response to such a request, that software executor is operable to request the secure executor to license-check, using its licensing model, whether the platform or a user thereof is licensed to use that data; in response to such latter request, the secure executor is operable to perform the requested license-check, to sign the result of the license check using a private key of the trusted module, and to respond to that software executor with the signed result; in response to such a response, that software executor is operable: to check the integrity of the signed result using the public key of the trusted module; and upon a successful integrity check of a successful license-check result, to request the operating system to use that data.

In a second execution mode: the software executor (or at least one of the software executors) contains a public key of the trusted module and a licensing model for the respective data; the operating system is operable to request the secure executor that particular data be used; in response to such a request, the secure executor is operable to send to the respective software executor a request, signed using a private key of the trusted module, for a licensing model for the particular data; in response to such latter request, that software executor is operable: to check the integrity of the request using the public key of the trusted module; and upon a successful integrity check, to send the licensing model to the secure executor; and upon receipt of the licensing model, the secure executor is operable: to perform a license-check using that licensing model; and upon a successful license-check, to request the operating system to use that data.

In a third execution mode: the secure executor contains at least one licensing model; the operating system is operable to request the secure executor that particular data be used; and in response to such a request, the secure executor is operable: to perform a license-check using the, or one of the, licensing models; and upon a successful license-check, to request the operating system to use that data.

With any of these three execution modes, preferably the operating system is programmed to use the particular data only in response to the secure executor or the software executor.

In a fourth execution mode: the secure executor contains at least one licensing model; the software executor (or at least one of the software executors) is operable to request the trusted module that its respective data be used; in response to such a request, the secure executor within the trusted module is operable: to perform a license-check using the, or one of the, licensing models; and upon a successful license-check, to request the operating system to use that data. In this case, preferably, the operating system is programmed to use the particular data only in response to the trusted module.

With any of the second to fourth execution modes, the request from the secure executor to the operating system to use the data is preferably supplied via the dedicated communications path.

With any of the first to fourth execution modes, preferably the trusted module is operable to log the request to the operating system to use the data. The security and reliability of licensing or metering is enhanced by securely logging data usage within the trusted module. Logging of licensing-related activity is carried out and recorded securely in the tamper-proof component. There is the option to carry this out at a number of different stages during licensing. The most common would be at the stage at which the data was allowed to run by the secure executor or software executor. Another common point would be at the stage at which the secure loader has successfully completed its integrity checks on the data to be installed, and has successfully installed this data onto the client machine. Since the secure executor, software executor and secure loader are protected by integrity checks, some protection is given against hackers trying to bypass or edit the logging process. Such logs would provide both secure auditing information and the possibility of flexible licensing and payment models such as pay-per-use, renting, time-dependent charges, and so on. Such audit logs would form the basis for usage reports and information accessible to third parties such as the machine user's IT department or company auditors. They would also have commercial value, such as for advertising or giving feedback on ratings.

In the case where the platform includes a further, removable, trusted module (such as a smart card) as mentioned above, it preferably includes a user identity, and, upon license-checking the secure executor or software executor is operable to perform the license-check with reference to the user identity.

When the user asks to run software or access protected data, the secure executor can perform the license-check, for example, by:

(a) Checking for a secret corresponding to a software or data reference, in a device, or (b) Using an unlock key to decrypt data and allowing it to execute (there are various options for differing functionality of the unlock key, including partial unlocking of the code), or (c) Checking for licensing rights in a database, corresponding to a data reference and a device identity, or (d) Retrieving a key from a database, corresponding to a data reference and a device identity, and using this to unlock the data.

When the user tries to run an application, it may be arranged that the secure executor assumes overall control, and that it retrieves information from the software executor, if one is present, associated with the data to find out which specific check is preferred by the developer. If a type of check is specified, the secure executor will carry this out; otherwise it will use a default check, as described below. If the check succeeds, the secure executor will execute the data. If the check fails, the secure executor will prevent the data from being executed.

If the software executor does not specify a licensing method, or there is no software executor attached to the application, the secure executor may use a default protocol that will have been defined for the particular machine. This will have been set by the machine's administrator with the machine's environment in mind; for example, if the machine is only used by one person, a licensing model corresponding to the internal trusted module would probably be most appropriate. It will not be possible to bypass the secure executor, and hence the licensing checks, because the secure executor code will have been included within the platform integrity check as part of the boot integrity procedure.

Different models of licensing use the secure executor and software executor in different ways. As will be appreciated from the above, it is possible to use them in combination, or with either performing the licensing checks. There are two main preferred options:

(1) The first option is to have different software executors attached to each piece of data, governing license checking within the secure executor for those particular pieces of data. In some of the examples in the next section, the software executors communicate directly with the operating system in this way.

(2) An alternative approach is to place more emphasis upon the secure executor, by building up the generic code within the platform which carries out the checks, and having the secure executor act as a bridge between the OS and any software executors. This alternative avoids putting the burden of the protocol-writing on the developer, allows the developer to specify licensing choices very easily and makes use of integrity checking of license checking code when the platform integrity check is made.

The software executor associated with a piece of data may include any particular information to be checked for (obtained during the registration process) together with information notifying the secure executor within the computer platform about the method of licensing to be used, the particular trusted device on which to make the check, and a reference to the data which is to be protected. For example, licensing_method(secret,sc,k,w) and licensing_method(secret,tc,k,w) indicate that the software referenced by w should be allowed to run on a machine only if the secret k is found stored within the current smart card or internal trusted component, respectively, of the machine.

Different software executors are attached to data, with software executors indicating which type of licensing model is to be used. The secure executor carries out a check at runtime, according to this licensing model, and does not allow the software w to run unless the check succeeds. By these means, communication from the clearinghouse to the trusted module specifies which licensing protocol the clearinghouse wishes to use.

Various specific protocols may be employed by the secure executor. For example, in a first protocol:
  the secure executor checks the trusted module ID entry or smart card ID entry;
  optionally, the secure executor downloads database entries into a profile stored within the trusted module;
  the secure executor checks in an external database or a profile stored within the trusted module against a data reference and the trusted module ID entry (or smart card ID entry) for an unlock key for the data;
  the secure executor retrieves this key and decrypts the associated data so that it may be executed by the operating system;
  optionally, the secure executor stores the unlock key within the trusted module, along with the data reference;
  the data is protected via encryption or partial encryption using the corresponding key;
  there are various options for differing functionality of the unlock key; and
  in return for payment, the database entry corresponding to the trusted module ID will be updated with this key.
In a second protocol:
  optionally, the secure executor downloads database entries into a profile stored within the trusted module;
  the secure executor checks in an external database or a profile stored within the trusted module for licensing rights, corresponding to a data reference and the trusted module ID entry (or smart card ID entry);
  only if there are appropriate licensing rights, the secure executor authorises the OS to execute the data; and
  in return for payment, the database entry corresponding to the trusted module ID or smart card ID will be updated with an appropriate permission.
In a third protocol:
  the secure executor checks for a secret corresponding to a software or data reference in a trusted module (including a smart card);
  the secret to be checked for is specified by the software executor associated with the data whose license is being checked; and
  only if the secret is present in the trusted module will the secure executor authorise the OS to execute the associated software or data.
In a fourth protocol:
  the secure executor uses an unlock key associated with some data stored within the trusted module or smart card to decrypt the data so that it may be executed by the operating system; and
  there are various options for differing functionality of the unlock key, including partial unlocking of the code.
In a fifth protocol:
  the secure executor uses a key associated with some data stored within the trusted module or smart card, or else inputted from the end-user via the keyboard, the trusted module or smart card ID and a pre-defined algorithm to calculate a decryption key;
  the secure executor uses the decryption key to decrypt the data so that it may be executed by the operating system;
  there are various options for differing functionality of the decryption key, including partial unlocking of the code.
In a sixth protocol:
  the secure executor allows use of floating licenses for a group of users;
  the secure executor checks in a database against the trusted module ID or smart card ID entry for a license key for the data;
  the secure executor retrieves a license key (if one were available) in order to allow that particular execution; and
  the secure executor returns the license key to the pool when the data execution is closed.
In a seventh protocol:
  the secure executor performs a combination of any the first to sixth protocols, such that different methods of license checking can be used for different data entities;
  the choice of protocol can be determined by the secure executor itself;
  a default or overriding protocol can be defined by an administrator; and
  the protocol to be used when checking licensing for particular data is determined by any software executor associated with that data Some licensing models later described in this document do not prevent copying of data, but just inhibit unauthorised use of data and secure the logging of usage on machines that have the tamper-proof device as part of the platform. The desired level of data protection depends upon the business model. Data can be sent via traditional and other non-secure channels. However, it is most important that the license key transfer is secure.

In accordance with a second aspect of the present invention, there is provided a method of transferring a license (or a key therefor) from a first to a second computer platform each in accordance with the first aspect of the invention, the method comprising the steps of: setting up secure communication between the trusted modules; sending the license or the key therefor from the first trusted module to the second trusted module using the secure communication; and deleting the license or the key therefor from the first trusted module.

There are many situations in which a customer might wish to transfer a license to another person or to another machine. For example, if a new PC were purchased, if software is upgraded or replaced, or if the customer wishes to run an application on a portable instead of a desktop. Moving a hardware dongle specific to each application is the easy solution and there is the analogous solution of using specific smart cards. However, all systems which provide a generic dongle, and therefore are more practical in most situations for end-users, are faced with a major problem of key management in this situation. Wave System's WaveNet and license management systems ('LMFs') are no exception. Software-only methods require an installation/deinstallation process, or else have to trust the end user to use only the number of licenses legitimately purchased when a second password is issued for the same license.

The options for license transferral using trusted modules depend upon the licensing aspect that is adopted. In general, these are as follows:

For licensing using a database check, the database entries corresponding to both machine trusted module IDs (if the license is changed to another machine) or both smart card IDs (if the license is changed to another person) should be changed.

For licensing involving a trusted module related fingerprint check or using code tailored to the trusted module, the new device (i.e. a smart card, if changing a license to another person; the internal trusted module, if changing a license to another machine) should be re-registered with the vendor, and another key or tailored software issued based on the new device ID obtained respectively.

For methods involving encryption and an unlock key, if there is one smart card per application, the appropriate smart card (and any pins) should be given to the new licensee. Otherwise, the unlock key and data can be transferred between trusted modules automatically, without the need for the vendor to be involved beyond receiving a report of the transfer (as described in the eighth method). This involves integrity checking of associated data, copying a license key from one trusted module to another, and deinstalling the license from the original trusted module.

The stages in transferring a license (i.e. unlock key L) for data S from TC1 in client machine M1 to TC2 in machine M2 are, for example, as follows:

A. Secure key transfer code ('SKT') is integrity checked as an extension of the BIS procedure. The license transfer code is hashed and signed with the manufacturer's private key. Upon boot/installation of the platform, the package is verified by hashing, and comparison with the decrypted signature to check integrity, using a public key certificate installed into the trusted module by the manufacturer. The license transfer code will not be loaded if the digital signature does not match what is expected, and the platform integrity check will fail.

B. Initialisation. The content provider already has the public key of TC1 via the original registration and data installation process; if not, this is sent to him.

1. If the owner of TC1 wishes to transfer the license to TC2, there is a call from the OS of machine M1 to the SKT within M1 to transfer the license for data S to TC2.

2. SKT in M1 generates a random number R and sends a message to M2 asking for the license to be transferred, containing a reference to the data S, together with the public key certificate of TC1.

3. If M2 obtains authorisation from an appropriate source, SKT in M2 replies in the affirmative, including R, the public key certificate of TC2, a reference to S, and a new nonce T that it has generated.

4. SKT in M1 then sends to M2 the public key certificate of the content provider of S, together with T.

These communications are appended to a hashed version of the communication signed by the trusted module's private key in the sender's machine, so that the receiver SKT can check the integrity of the message. If the integrity checks fail, messages are sent by each SKT to the OS within their machines and the protocol stops.

C. Program upload. If the above authentication is successful, TC1 hashes the data S (optionally a version already signed by the content provider) and signs it with the private key of TC1 (for example, using Microsoft's Authenticode). TC1 then uploads this signature together with the data into TC2. Optionally, the data is encrypted.

D. Code verification. The secure loader within TC2 verifies the signatures of the data S: it checks the signature using TC1's public key, thereby retrieving the message hash; next it computes the hash of S to check that it is the same as the decrypted message hash. If this validation is successful, the secure loader installs the program into the machine corresponding to TC2. If not, it generates an error message to the SKT which blocks further passage of the license transfer protocol.

E. Transfer key. The SKT in M1 generates a symmetric key using a random number generator, and uses it to encrypt a message transporting the unlock key. The SKT in M1 sends this message to the SKT in M2, together with the symmetric key encrypted with TC2's public key and also a hash of all this information, signed with TC1's private key. Only TC2 will have the RSA private key to decrypt the symmetric key, which will allow decryption of the unlock key.

F. Message verification. The SKT in M2 checks the signature using the public key of TC1, and decrypts the message using the symmetric key obtained by decryption using TC2's private key, thus obtaining the unlock key. If the signature is correct, the key is stored within the trusted component, and associated with the data S. If the signature is not correct, an error message is sent to the SKT in M1 and the protocol stops.

G. Key deleted from TC1, and content provider notified. The SKT in M1 deletes the unlock key from TC1 and makes a log of this in TC1. The SKT in M1 sends a message to the content provider, signed using the private key of TC1, informing the content provider that the license for code S has been transferred to M2. Optionally, SKT in M1 or in M2 sends a message to the data vendor giving details of how the owner of M2 may be contacted for registration.

There is an option for the trusted component, and the software executor, to act as a new part of the operating system, and form a bridge between the operating system and applications, by providing an environment for certain functions. For example, API calls can be made to the trusted module such as 'save' and 'restore'. 'Save' will pass data through the trusted module, which will encrypt the data in the trusted module and store it either in the trusted module or on the hard disk. It will not be possible to access this data without the permission of the trusted module. There is an additional option to carry out some transformations within the trusted module using such data, and for the software to use API calls to request information from the trusted module and get an answer exported. In summary, API calls can be used from the software executor or application code to the trusted module to check the presence of the trusted module or a private application key stored on the trusted module (analogous to existing dongle methods), and further, to use the trusted module for providing an environment for certain functions or data storage.

More specifically, API calls may be added to the application code or the software executor and used to query the OS, trusted module or secure executor via the client library. For example, API calls may be added to the application code or the software executor and used to query the trusted module or secure executor via the client library to check for the presence of a private application key or other secret in the trusted module or smart card or to check for the identity and presence of the trusted module or smart card.

In one particular model which will be described in more detail later, a licensing model is employed in which an entry in a licensing-related database corresponding to the trusted module's ID is updated, and the secure executor will only allow data to run once permissions on this database have been checked. In this case, the software executor associated with an application calls the secure executor (possibly in the trusted module), the secure executor checks the licensing rights, and if this check succeeds, passes the call to the operating system ('OS') in order for the application to be run in the normal manner. In other words, the OS accepts calls to execute data only if the call comes from secure license-related code such as the secure executor or software executor.

In another particular model which will be described in more detail later, the trusted module preferably stores hardware and/or software used to implement the invention and the OS accepts calls to execute data if the call comes from the trusted module. In particular, the trusted module preferably acts as a bridge between an application and the OS and the OS preferably ignores all requests to load applications except for those from the trusted module.

One possible licensing model would be for the secure executor to check in a database against the trusted module ID entry for an unlock key for the data. In this case the data is protected via encryption or partial encryption using the corresponding key, and hence can be freely distributed without fear of piracy. Once payment is made, the database entry corresponding to the trusted module's ID will be updated with this key. When the user wishes to run the application, the key can be retrieved to allow the data to be unlocked. The key may then be stored in the tamper-proof device so that the database look-up need only happen once. However, in licensing models where floating licenses are desired, it would be more appropriate to store such keys centrally and allow access only on each execution, so that the license can then be restored to the appropriate group for use by another user. Thus, a model for license "exchange" is provided.

Accordingly, the present invention extends to the case in which there is optional interaction between the secure executor, the software executor and the trusted module to use floating licenses for a group of users via the secure executor or software executor instigating a check in a database against the trusted module ID entry for a license key for the software, retrieving a license key (if one were available) in order to allow that particular execution, and returning the license key to the pool when the application is closed.

In order to accommodate more flexible situations such as hot-desking, when a variety of users use generic terminals, a combination of multiple trusted devices can be used. In particular, a combination of fixed tamper-proof components and portable tamper-proof components gives great flexibility in licensing. Most obviously, a personal user's smart card would be used in combination with an internal tamper-proof device within the computer. On this type of licensing model, the software executor or secure executor would run the data only if a particular smart card is present (or one of a selected group of smart cards is present).

The internal trusted module contains a trusted machine identity, and the portable trusted module (in this case, a smart card) contains an identity specific to the user (which could be authenticated using an incorporated biometric device). Many different ways of licensing could be used in such a situation (one example is given in the following section), and these are analogous to the options presented in the 'Preferred Embodiment' section. The differences are that, according to the particular model implemented:

The smart card identity is involved in the licensing check carried out by the secure executor or software executor, rather than the internal machine identity. Hence, for example, the user identity is checked against the profile or directory rather than the machine identity. In the case of unlock keys being stored on the smart card, the presence of the smart card ID within the trusted module will cause the secure executor when requiring the unlock key to (a) copy the unlock key in an encrypted form to the trusted module, by the smart card encrypting it using the trusted module's public key, or (b) use the unlock key from the smart card directly.

There is authentication between the internal trusted module and the smart card. Authentication between the smart card and trusted module is carried out at the stage at which the smart card is inserted, and the current smart card ID is temporarily stored within the trusted module, to be used for the licensing check in the same way as the trusted module ID would have been used in the licensing models described in this document (see Examples A, B and F described later). When the smart card is removed, or (with single sign on) the user logs out, this temporary smart card ID value within the trusted module is reset to a null value.

Both user-based licensing and machine-based licensing could be used for different data within the same machine. This could be done by (a) checking directory entries against the smart card ID rather than the machine ID if the smart card ID value within the trusted module is not null (and against the machine ID if this fails), or (b) checking for an unlock key within the smart card if a smart card is currently inserted in the reader—that is to say, either requesting this to be copied to the trusted module, or using it directly.

Accordingly, the invention extends to the case in which there is optional use of a combination of an internal machine trusted module and a portable trusted module (and the secure executor and software executor) to perform license checking based on the user identity associated with the portable trusted module.

A licensing system of the present invention which will be described in more detail below, has the following features:
the computer platform is registered with a third party C. Optionally, C is given the trusted module ID or smart card ID;
authentication between the trusted module and C and exchange of public key certificates takes place before, or at the same time as, exchange of DES session keys for confidentiality of the messages;
the secure loader performs an integrity check on the data, and only installs the data if this succeeds;
the data is executed using one of the protocols described above; and each developer can use either generic or specific content protection.

In one form:

data encrypted using a key K is signed under C's private code signing key and sent by C to the trusted module;

the unlock key corresponding to K is encrypted by C using the trusted module's public key, signed using C's private code signing key, and sent to the computer platform; and the key transfer code decrypts the unlock key, checks integrity and the signature, and this key is then stored in the trusted module, associated with the relevant data.

In another form:

data encrypted using a key K is signed under C's private code signing key and sent by C to the trusted module;

an unlock key is transferred from C to the end-user of the computer platform or to the computer platform;

the key transfer code calculates the decryption key corresponding to K from the unlock key, the trusted module or smart card ID and a pre-stored algorithm;

optionally, the previous stage is carried out by the secure executor or software executor associated with the data; and this decryption key is then stored in the trusted module or a smart card, associated with the relevant data.

In a further form:

data encrypted using a key K and any associated software executor is signed under C's private code signing key and sent by C to the trusted module; and the unlock key corresponding to K is inserted into the database entry corresponding to the trusted module ID or smart card ID.

In yet another form:

data and any associated software executor is signed under C's private code signing key and sent by C to the trusted module; and an entry corresponding to permission to execute the data is inserted into the database entry corresponding to the trusted module ID or smart card ID, or vice versa.

A specific embodiment of the present invention will now be described, purely by way of example, with reference to the accompanying drawings, in which:

FIG. 15 is a diagram of the logical components of a trusted module in the system of FIG. 14;

FIG. 16 illustrates the structure of protected software of data in the system of FIG. 14;

Figure 1:
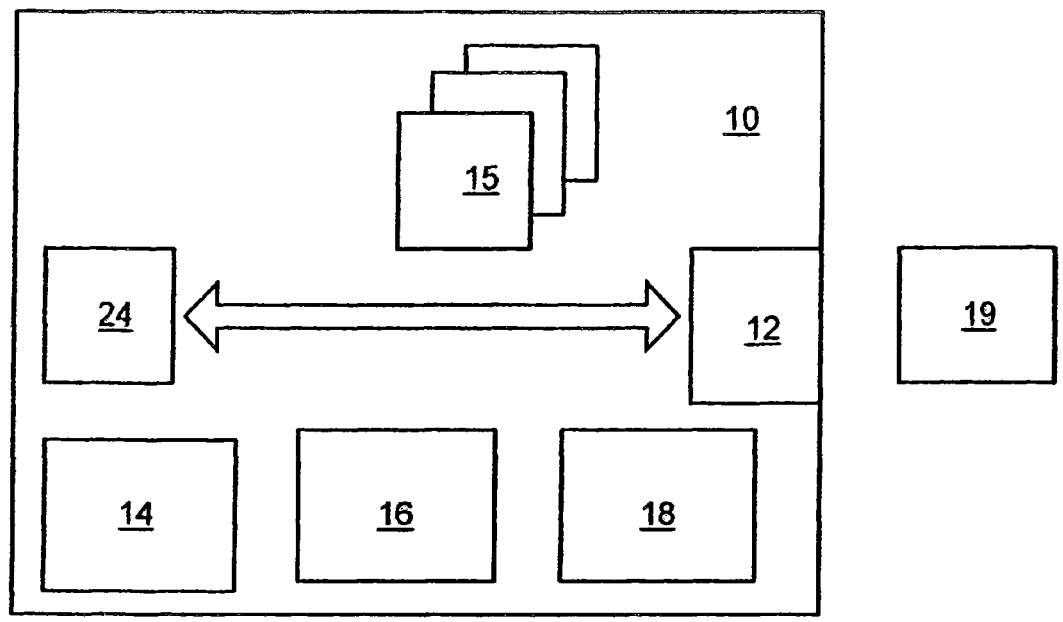
FIG. 1 is a diagram that illustrates a system capable of implementing embodiments of the present invention.

Before describing the embodiment of the present invention, the computing platform incorporating a trusted device which is the subject of International Patent Application No. PCT/GB00/00528, filed on 15 Feb. 2000, will firstly be described with reference to FIGS. 1 to 7. A computing platform of this general type is particularly suitable for use in embodiments of the present invention. Also described (as it is relevant to certain of the embodiments described below) is the use of a trusted token device personal to a user of the computer platform—in preferred examples, this token device is a smart card.

That application describes the incorporation into a computing platform of a physical trusted device or module whose function is to bind the identity of the platform to reliably measured data that provides an integrity metric of the platform, thereby forming a "trusted platform". The identity and the integrity metric are compared with expected values provided by a trusted party (TI) that is prepared to vouch for the trustworthiness of the platform. If there is a match, the implication is that at least part of the platform is operating correctly, depending on the scope of the integrity metric.

In this specification, the term "trusted" when used in relation to a physical or logical component, is used to mean that the physical or logical component always behaves in an expected manner. The behavior of that component is predictable and known. Trusted components have a high degree of resistance to unauthorized modification.

In this specification, the term "computing platform" (or "computer platform") is used to refer to at least one data processor and at least one data storage means, usually but not essentially with associated communications facilities e.g. a plurality of drivers, associated applications and data files, and which may be capable of interacting with external entities e.g. a user or another computer platform, for example by means of connection to the internet, connection to an external network, or by having an input port capable of receiving data stored on a data storage medium, e.g. a CD ROM, floppy disk, ribbon tape or the like.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the integrity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

A user of a computing entity may, for example, establish a level of trust with the computer entity by use of such a trusted token device. The trusted token device is a personal and portable device having a data processing capability and in which the user has a high level of confidence. It may also be used by the trusted platform to identify the user. The trusted token device may perform the functions of:

verifying a correct operation of a computing platform in a manner which is readily apparent to the user, for example by audio or visual display;

challenging a monitoring component to provide evidence of a correct operation of a computer platform with which the monitoring component is associated; and establishing a level of interaction of the token device with a computing platform, depending on whether a monitoring component has provided satisfactory evidence of a correct operation of the computing entity, and withholding specific interactions with the computer entity if such evidence of correct operation is not received by the token device.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the system described, it does not enter into the normal operation of the present invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

A trusted platform 10 is illustrated in the diagram in FIG. 1. The platform 10 includes the standard features of a keyboard 14 (which provides a user's confirmation key), mouse 16 and monitor 18, which provide the physical 'user interface' of the platform. This embodiment of a trusted platform also contains a smart card reader 12. Along side the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform. The functional significance of such elements is not relevant to the present invention and will not be discussed further herein. Additional components of the trusted computer entity will typically include one or more local area network (LAN) ports, one or more modem ports, and one or more power supplies, cooling fans and the like.

Figure 2:
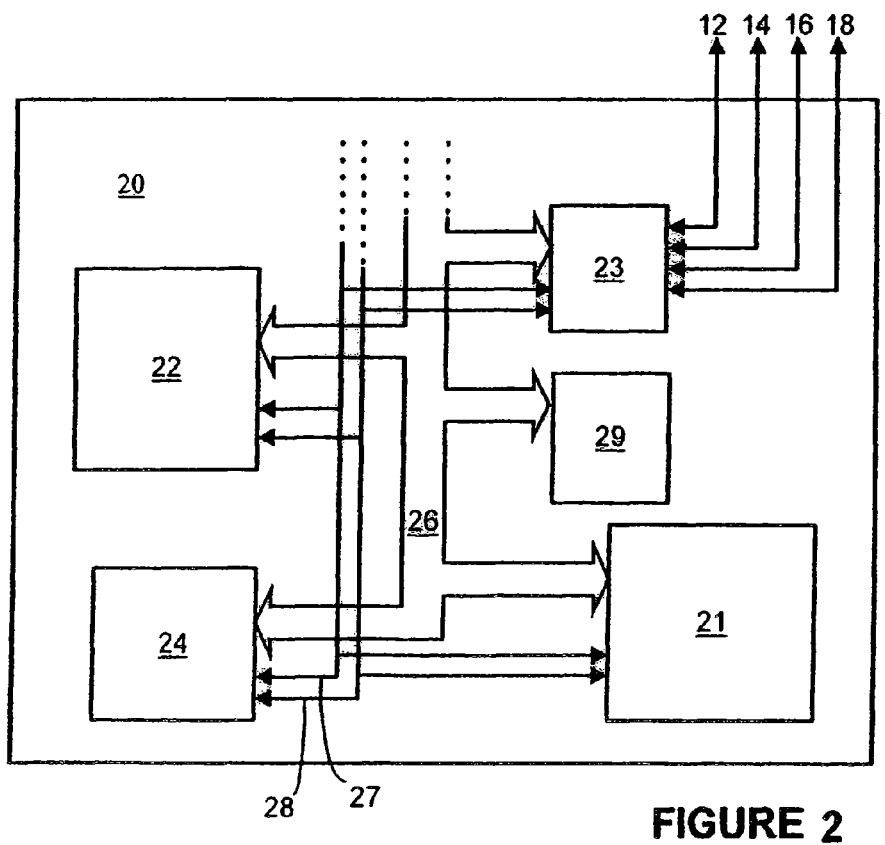
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the monitor 18 (and any additional peripheral devices such as a modem, printer, scanner or the like). The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

The computer entity can be considered to have a logical, as well as a physical, architecture. The logical architecture has a same basic division between the computer platform, and the trusted component, as is present with the physical architecture described in FIGS. 1 to 4 herein. That is to say, the trusted component is logically distinct from the computer platform to which it is physically related. The computer entity comprises a user space being a logical space which is physically resident on the computer platform (the first processor and first data storage means) and a trusted component space being a logical space which is physically resident on the trusted component. In the user space are one or a plurality of drivers, one or a plurality of applications programs, a file storage area; smart card reader; smart card interface; and a software agent which can perform operations in the user space and report back to trusted component. The trusted component space is a logical area based upon and physically resident in the trusted component, supported by the second data processor and second memory area of the trusted component. Monitor 18 receives images directly from the trusted component space. External to the computer entity are external communications networks e.g. the Internet, and various local area networks, wide area networks which are connected to the user space via the drivers (which may include one or more modem ports). An external user smart card inputs into smart card reader in the user space.

Typically, in a personal computer the BIOS program is located in a special reserved memory area, the upper 64K of the first megabyte do the system memory (addresses F000h to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the system here described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present system the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
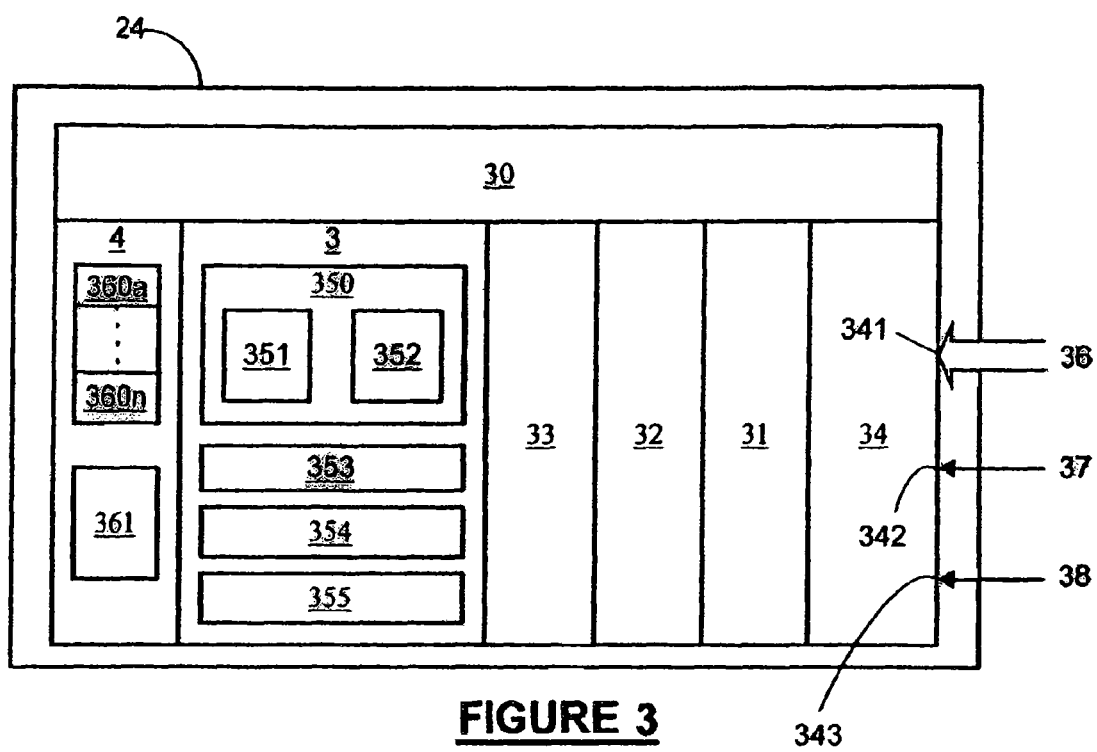
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
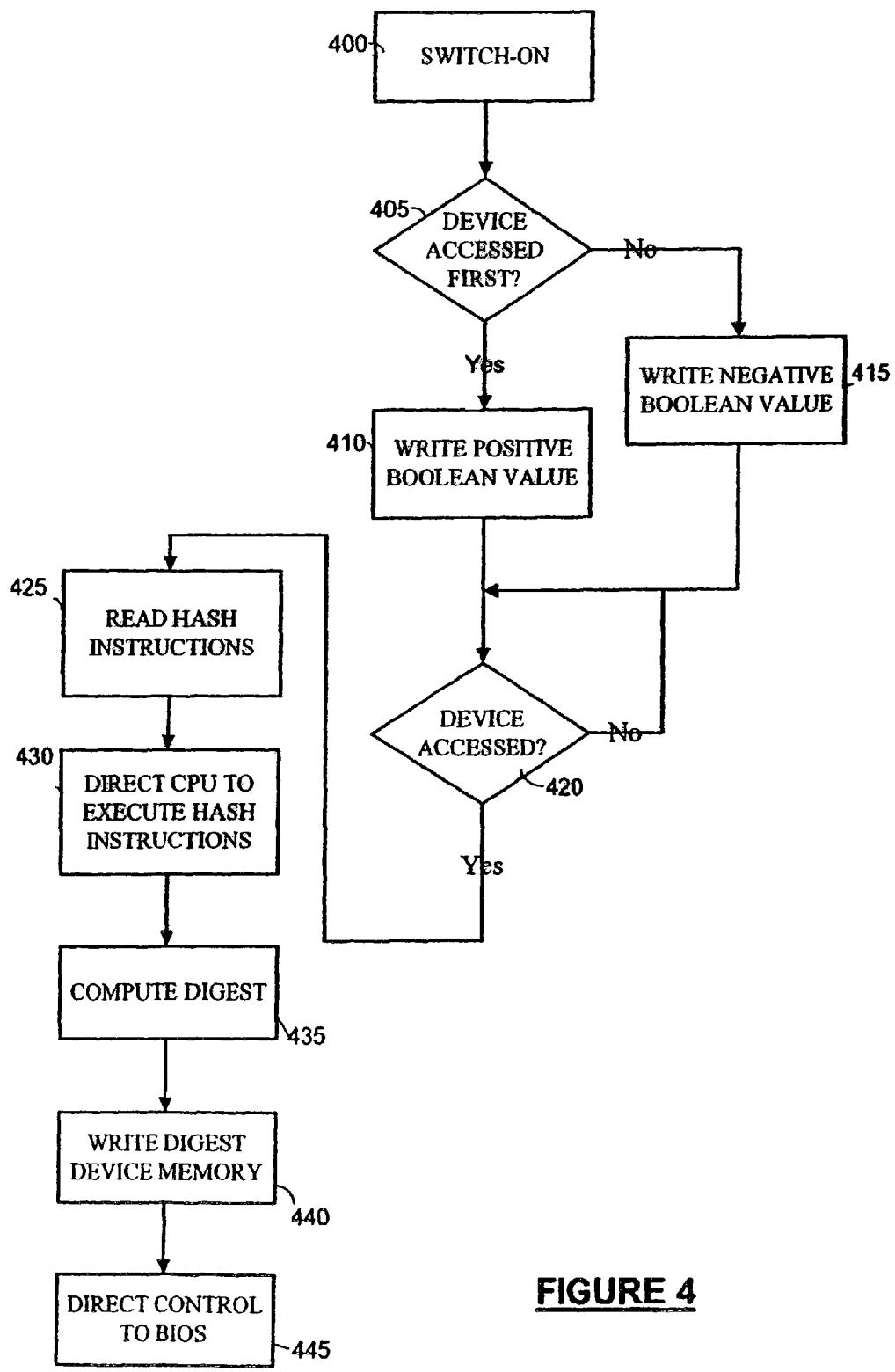
FIG. 4 is a flow diagram which illustrates the steps involved in acquiring an integrity metric of the computing apparatus.

A preferred process for acquiring an integrity metric will now be described with reference to FIG. 4.

In step 400, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 405, if the trusted device 24 is the first memory accessed, in step 410, the measurement function 31 writes to non-volatile memory 3 a Boolean value, which indicates that the trusted device 24 was the first memory accessed.

Otherwise, in step 415, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 420, when (or if) accessed as a memory by the main processor 21, the main processor 21 reads the stored native hash instructions 354 from the measurement function 31 in step 425. The hash instructions 354 are passed for processing by the main processor 21 over the data bus 26. In step 430, main processor 21 executes the hash instructions 354 and uses them, in step 435, to compute a digest of the BIOS memory 29, by reading the contents of the BIOS memory 29 and processing those contents according to the hash program. In step 440, the main processor 21 writes the computed digest 361 to the appropriate non-volatile memory location 4 in the trusted device 24. The measurement function 31, in step 445, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 24 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric, it is anticipated that, in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
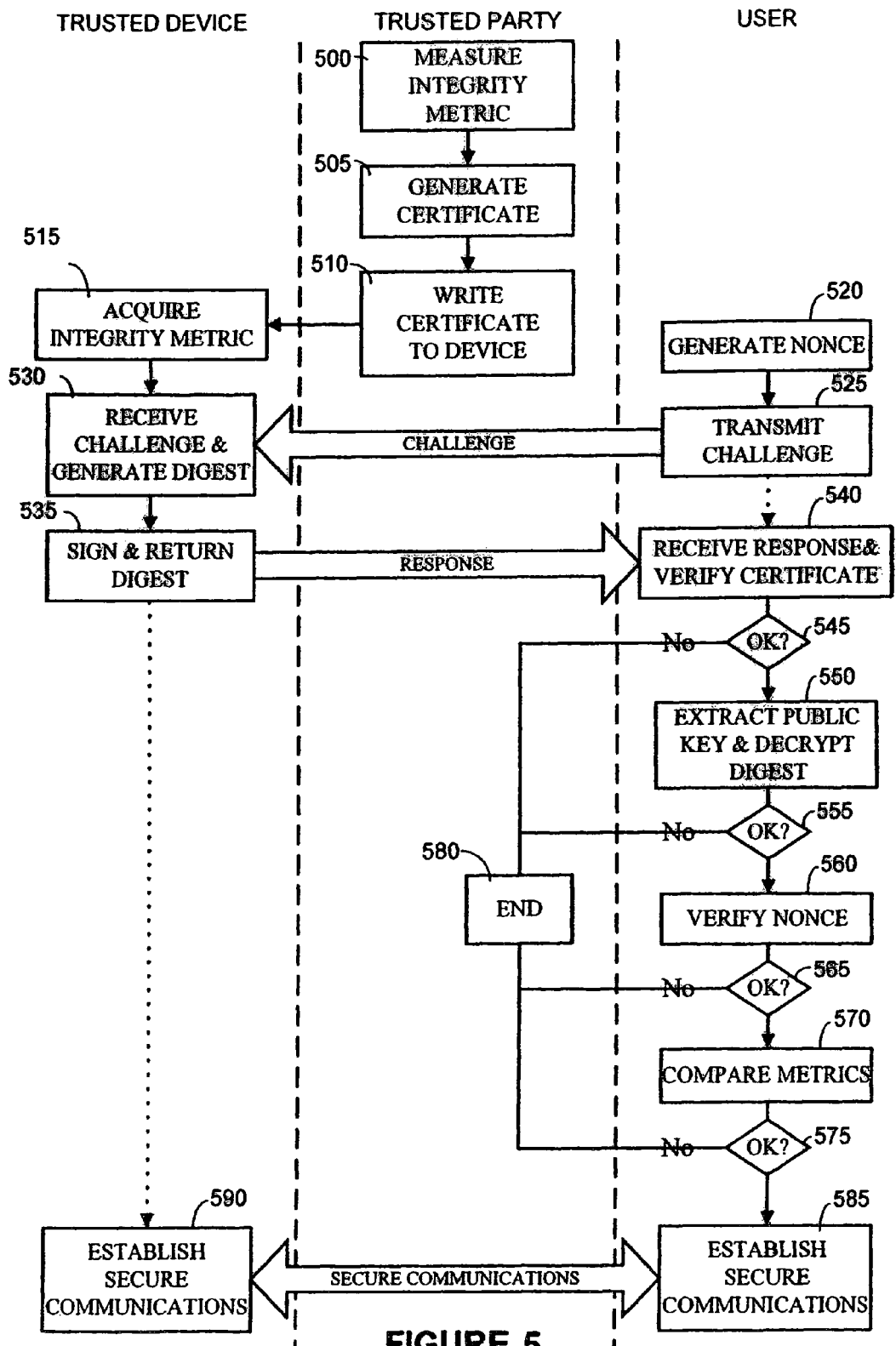
FIG. 5 is a flow diagram which illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is preferred that, for a high level of integrity, the software application would reside on a smart card of the user, who would insert the smart card into an appropriate reader for the purposes of verification. Particular embodiments relate to such an arrangement.

At the first instance, a TP, which vouches for trusted platforms, will inspect the type of the platform to decide whether to vouch for it or not. This will be a matter of policy. If all is well, in step 500, the TP measures the value of integrity metric of the platform. Then, the TP generates a certificate, in step 505, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 510, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 515, the trusted device 24 acquires and stores the integrity metric 361 of the platform.

When a user wishes to communicate with the platform, in step 520, he creates a nonce, such as a random number, and, in step 525, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 530, the trusted device 24 receives the challenge and creates an appropriate response. This may be a digest of the measured integrity metric and the nonce, and optionally its ID label. Then, in step 535, the trusted device 24 signs the digest, using its private key, and returns the signed digest, accompanied by the certificate 350, to the user.

In step 540, the user receives the challenge response and verifies the certificate using the well known public key of the TP. The user then, in step 550, extracts the trusted device's 24 public key from the certificate and uses it to decrypt the signed digest from the challenge response. Then, in step 560, the user verifies the nonce inside the challenge response. Next, in step 570, the user compares the computed integrity metric, which it extracts from the challenge response, with the proper platform integrity metric, which it extracts from the certificate. If any of the foregoing verification steps fails, in steps 545, 555, 565 or 575, the whole process ends in step 580 with no further communications taking place.

Assuming all is well, in steps 585 and 590, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

The user's smart card 19 is a token device, separate from the computing entity, which interacts with the computing entity via the smart card reader port 19. A user may have several different smart cards issued by several different vendors or service providers, and may gain access to the internet or a plurality of network computers from any one of a plurality of computing entities as described herein, which are provided with a trusted component and smart card reader. A user's trust in the individual computing entity to which s/he is using is derived from the interaction between the user's trusted smart card token and the trusted component of the computing entity. The user relies on their trusted smart card token to verify the trustworthiness of the trusted component.

Figure 6:
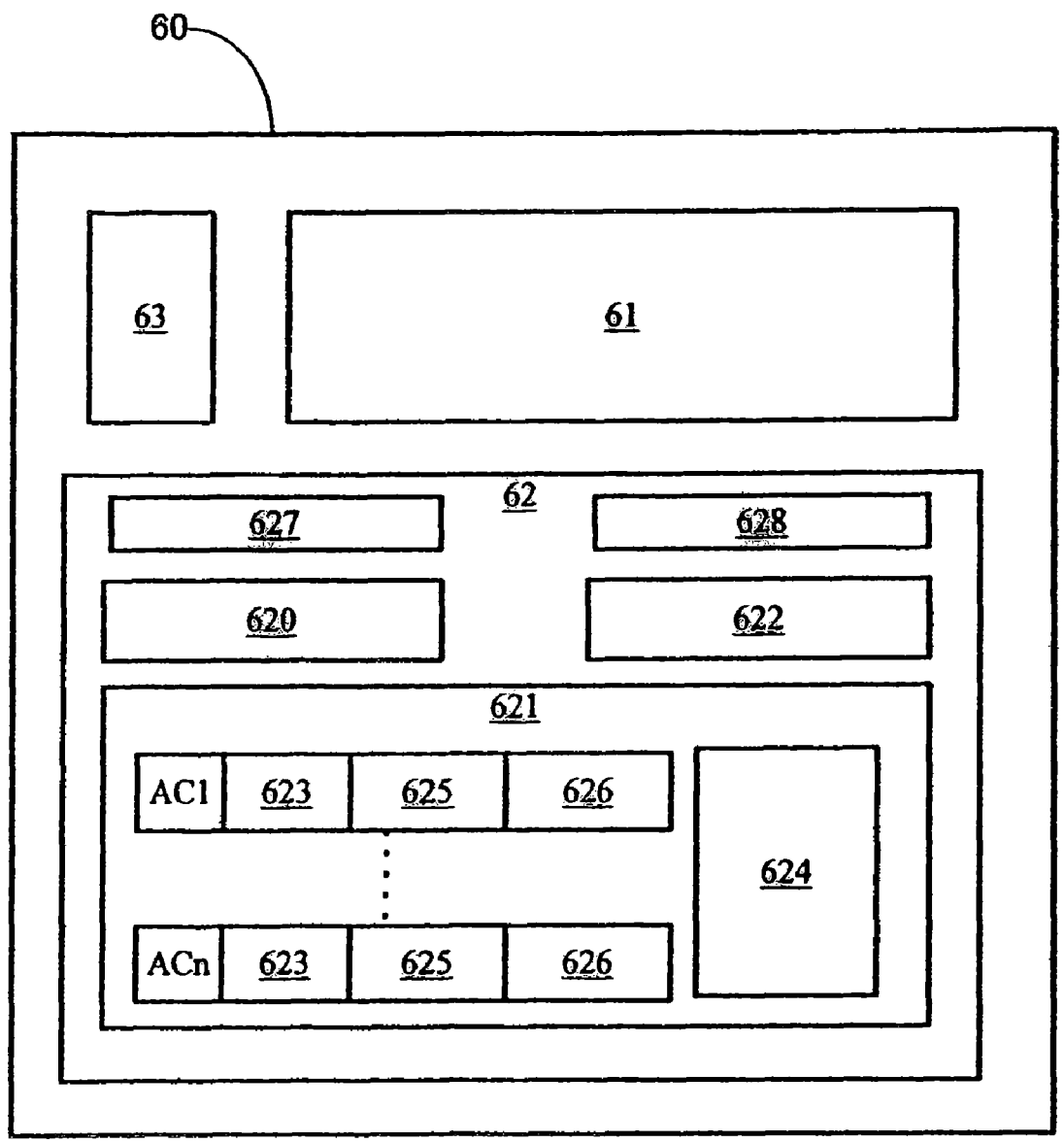
FIG. 6 is a diagram that illustrates the operational parts of a user smart card for use in accordance with embodiments of the present invention.

A processing part 60 of a user smart card 19 is illustrated in FIG. 6. As shown, the user smart card 19 processing part 60 has the standard features of a processor 61, memory 62 and interface contacts 63. The processor 61 is programmed for simple challenge/response operations involving authentication of the user smart card 19 and verification of the platform 10, as will be described below. The memory 62 contains its private key 620, its public key 628, (optionally) a user profile 621, the public key 622 of the TP and an identity 627. The user profile 621 lists the allowable auxiliary smart cards 20 AC1-ACn usable by the user, and the individual security policy 624 for the user. For each auxiliary smart card 20, the user profile includes respective identification information 623, the trust structure 625 between the smart cards (if one exists) and, optionally, the type or make 626 of the smart card.

In the user profile 621, each auxiliary smart card 20 entry AC1-ACn includes associated identification information 623, which varies in dependence upon the type of card. For example, identification information for a cash card typically includes a simple serial number, whereas, for a crypto card, the identification information typically comprises the public key (or certificate) of the crypto card (the private key being stored secretly on the crypto card itself).

The 'security policy' 624 dictates the permissions that the user has on the platform 10 while using an auxiliary smart card 20. For example, the user interface may be locked or unlocked while an auxiliary smart card 20 is in use, depending on the function of the auxiliary smart card 20. Additionally, or alternatively, certain files or executable programs on the platform 10 may be made accessible or not, depending on how trusted a particular auxiliary smart card 20 is. Further, the security policy 624 may specify a particular mode of operation for the auxiliary smart card 20, such as 'credit receipt' or 'temporary delegation', as will be described below.

A 'trust structure' 625 defines whether an auxiliary smart card 20 can itself 'introduce' further auxiliary smart cards 20 into the system without first re-using the user smart card 19. In the embodiments described in detail herein, the only defined trust structure is between the user smart card 19 and the auxiliary smart cards 20 that can be introduced to the platform 10 by the user smart card 19. Introduction may be 'single session' or 'multi-session', as will be described below. However, there is no reason why certain auxiliary smart cards 20 could not in practice introduce further auxiliary smart cards 20. This would require an auxiliary smart card 20 to have an equivalent of a user profile listing the or each auxiliary smart card that it is able to introduce. Use of auxiliary smart cards 20 is not a necessary feature of the present invention, and is not described further in the present application. Use of auxiliary smart cards is the subject of the present applicant's copending International Patent Application No. PCT/GB00/00751 dated 5 Mar. 2000 and entitled "Computing Apparatus and Methods of Operating Computing Apparatus", which is incorporated by reference herein.

Figure 7:
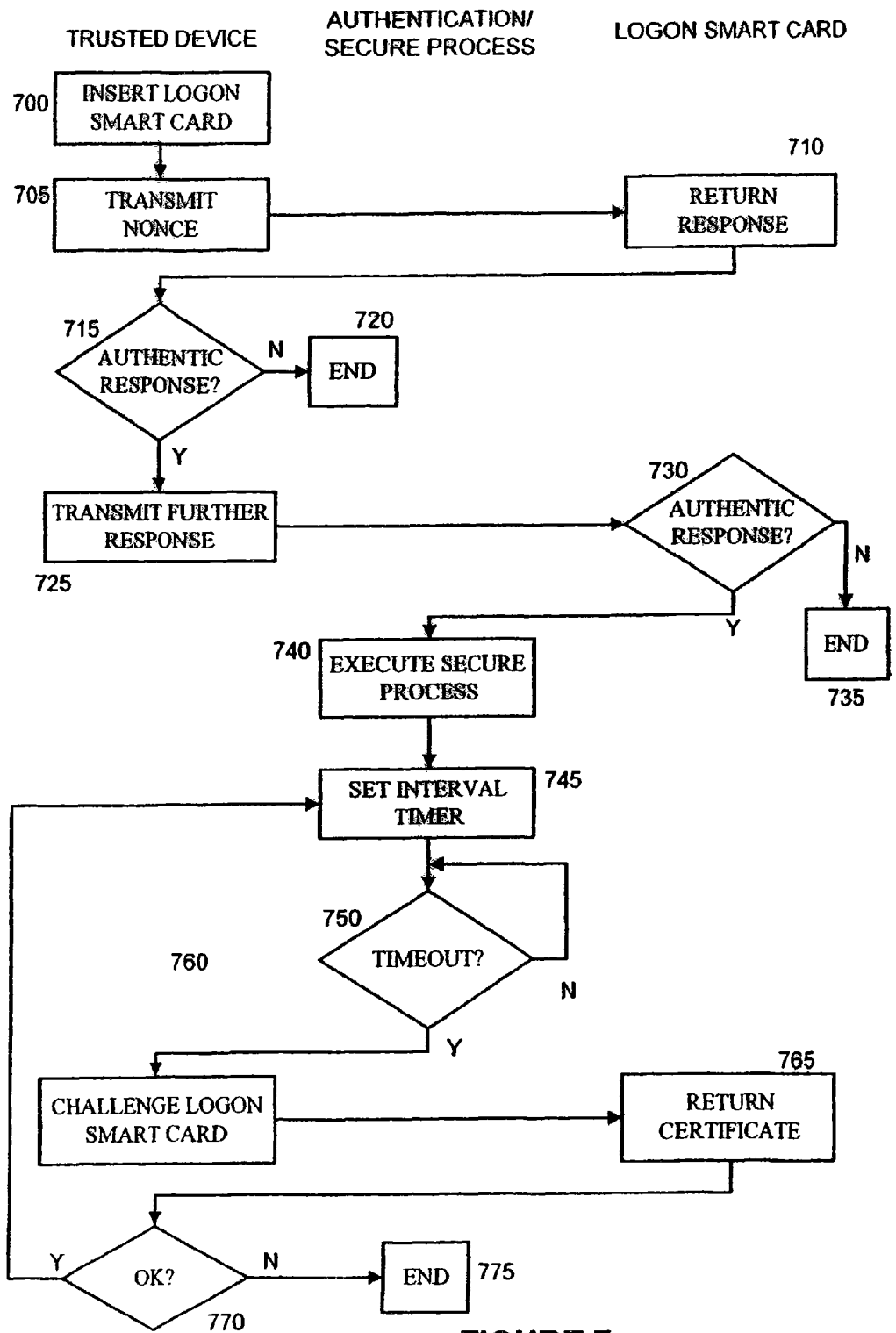
FIG. 7 is a flow diagram which illustrates the process of mutually authenticating a smart card and a host platform.

A preferred process for authentication between a user smart card 19 and a platform 10 will now be described with reference to the flow diagram in FIG. 7. As will be described, the process conveniently implements a challenge/response routine. There exist many available challenge/response mechanisms. The implementation of an authentication protocol used in the present embodiment is mutual (or 3-step) authentication, as described in ISO/IEC 9798-3. Of course, there is no reason why other authentication procedures cannot be used, for example 2-step or 4-step, as also described in ISO/IEC 9798-3.

Initially, the user inserts their user smart card 19 into the smart card reader 12 of the platform 10 in step 700. Beforehand, the platform 10 will typically be operating under the control of its standard operating system and executing the authentication process, which waits for a user to insert their user smart card 19. Apart from the smart card reader 12 being active in this way, the platform 10 is typically rendered inaccessible to users by 'locking' the user interface (i.e. the screen, keyboard and mouse).

When the user smart card 19 is inserted into the smart card reader 12, the trusted device 24 is triggered to attempt mutual authentication in step by generating and transmitting a nonce A to the user smart card 19 in step 705. A nonce, such as a random number, is used to protect the originator from deception caused by replay of old but genuine responses (called a 'replay attack') by untrustworthy third parties.

In response, in step 710, the user smart card 19 generates and returns a response comprising the concatenation of: the plain text of the nonce A, a new nonce B generated by the user smart card 19, the ID 353 of the trusted device 24 and some redundancy; the signature of the plain text, generated by signing the plain text with the private key of the user smart card 19; and a certificate containing the ID and the public key of the user smart card 19.

The trusted device 24 authenticates the response by using the public key in the certificate to verify the signature of the plain text in step 715. If the response is not authentic, the process ends in step 720. If the response is authentic, in step 725 the trusted device 24 generates and sends a further response including the concatenation of: the plain text of the nonce A, the nonce B, the ID 627 of the user smart card 19 and the acquired integrity metric; the signature of the plain text, generated by signing the plain text using the private key of the trusted device 24; and the certificate comprising the public key of the trusted device 24 and the authentic integrity metric, both signed by the private key of the TP.

The user smart card 19 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 24 has authenticated the user smart card 19 and the user smart card 19 has verified the integrity of the trusted platform 10 and, in step 740, the authentication process executes the secure process for the user. Then, the authentication process sets an interval timer in step 745. Thereafter, using appropriate operating system interrupt routines, the authentication process services the interval timer periodically to detect when the timer meets or exceeds a pre-determined timeout period in step 750.

Clearly, the authentication process and the interval timer run in parallel with the secure process. When the timeout period is met or exceeded, the authentication process triggers the trusted device 24 to re-authenticate the user smart card 19, by transmitting a challenge for the user smart card 19 to identify itself in step 760. The user smart card 19 returns a certificate including its ID 627 and its public key 628 in step 765. In step 770, if there is no response (for example, as a result of the user smart card 19 having been removed) or the certificate is no longer valid for some reason (for example, the user smart card has been replaced with a different smart card), the session is terminated by the trusted device 24 in step 775. Otherwise, in step 770, the process from step 745 repeats by resetting the interval timer.

The techniques of signing, using certificates, and challenge/response, and using them to prove identity, are well known to those skilled in the art of security and will, thus, not be described in any more detail herein.

Figure 21:
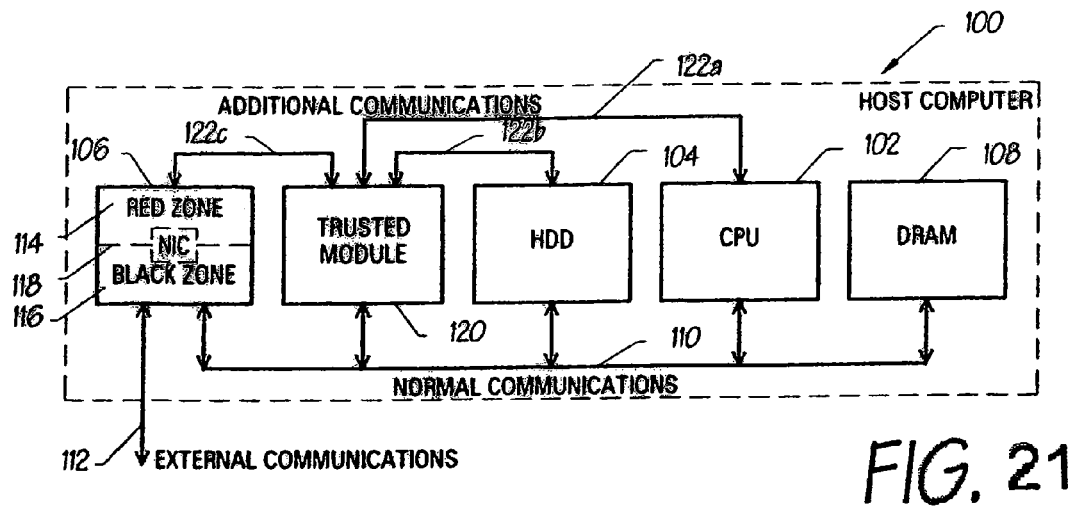
FIG. 21 is a schematic block diagram of a host computer system which is the subject of another patent application (International Patent Application No. PCT/GB00/00504, filed on 15 Feb. 2000).

Referring now to FIGS. 21 and 8 to 13, a modified form of the system described above with reference to FIGS. 1 to 7 will now be described. This modified form is the subject of International Patent Application No. PCT/GB00/00504, filed on 15 Feb. 2000. In FIG. 21, a host computer 100 has a main CPU 102, a hard disk drive 104, a PCI network interface card 106 and DRAM memory 108 with conventional ("normal") communications paths 110 (such as ISA, EISA, PCI, USB) therebetween. The network interface card 106 also has an external communication path 112 with the world outside the host computer 100.

The network interface card 106 is logically divided into "red" and "black" data zones 114, 116 with an interface 118 therebetween. In the red zone 114, data is usually plain text and is sensitive and vulnerable to undetectable alteration and undesired eavesdropping. In the black data zone 116, data is protected from undetected alteration and undesired eavesdropping (preferably encrypted by standard crypto mechanisms). The interface 118 ensures that red information does not leak into the black zone 116. The interface 118 preferably uses standard crypto methods and electronic isolation techniques to separate the red and black zones 114,116. The design and construction of such red and black zones 114,116 and the interface 118 is well known to those skilled in the art of security and electronics, particularly in the military field. The normal communication path 110 and external communication path 112 connect with the black zone 116 of the network interface card 106.

The host computer 100 also includes a trusted module 120 which is connected, not only to the normal communication paths 110, but also by mutually separate additional communication paths 122 (sub-referenced 122a,122b, 122c) to the CPU 102, hard disk drive 104 and the red zone 114 of the network interface card 106. By way of example, the trusted module 120 does not have such a separate additional communication path 122 with the memory 108.

The trusted module 120 can communicate with the CPU 102, hard disk drive 104 and red zone 114 of the network interface card 106 via the additional communication paths 122a,b,c, respectively. It can also communicate with the CPU 102, hard disk drive 104, black zone 116 of the network interface card 106 and the memory 108 via the normal communication paths 110. The trusted module 120 can also act as a 100 VG switching centre to route certain information between the CPU 102, hard disk drive 104 and the red zone 114 of the network interface card 106, via the trusted module 120 and the additional communication paths 122, under control of a policy stored in the trusted module. The trusted module 120 can also generate cryptographic keys and distribute those keys to the CPU 102, the hard disk drive 104, and the red zone 114 of the network interface card 106 via the additional communication paths 122a,b,c, respectively.

Figure 8:
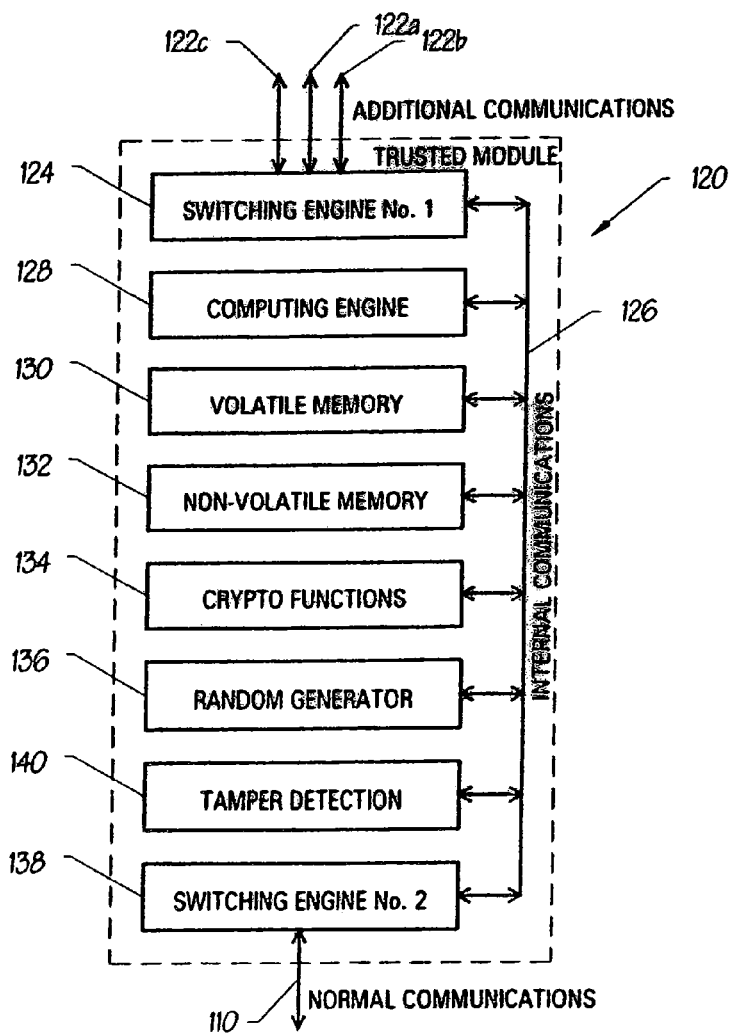
FIG. 8 is a schematic block diagram of a trusted module in the system of FIG. 21.

FIG. 8 illustrates the physical architecture of the trusted module 120. A first switching engine 124 is connected separately to the additional communication paths 122a,b,c and also to an internal communication path 126 of the trusted module 120. This switching engine 124 is under control of a policy loaded into the trusted module 120. Other components of the trusted module 120 are:

- a computing engine 128 that manages the trusted module 120 and performs general purpose computing for the trusted module 120;
- volatile memory 130 that stores temporary data;
- non-volatile memory 132 that stores long term data;
- cryptographic engines 134 that perform specialist crypto functions such as encryption and key generation;
- a random number source 136 used primarily in crypto operations;
- a second switching engine 138 that connects the trusted module 120 to the normal communication paths 110; and
- tamper detection mechanisms 140, all connected to the internal communication path 126 of the trusted module 120.

The trusted module 120 is based on a trusted device or module 24 as described in more detail above with reference to FIGS. 1 to 7.

With regard to crypto key generation and distribution, the trusted module 120 generates cryptographic keys, using the random number generator 136, a hash algorithm, and other algorithms, all of which are well known, per se, to those skilled in the art of security. The trusted module 120 distributes selected keys to the CPU 102, hard disk drive 104 and the red zone 114 of the network interface card 106 using the additional communication paths 122a,b,c, respectively, rather than the normal communications paths 110. Keys may be used for communications between the internal modules 102, 104, 106, 120 of the platform over the normal communication paths 110. Other temporary keys may be used (by the network interface card 106 or CPU 102) for bulk encryption or decryption of external data using the SSL protocol after the trusted module 120 has completed the SSL handshaking phase that uses long term identity secrets that must not be revealed outside the trusted module 120. Other temporary keys may be used (by the hard disk drive 104 or CPU 102) for bulk encryption or decryption of data stored on the hard disk drive 104 after those temporary keys have been created or revealed inside the trusted module 120 using long term secrets that must not be revealed outside the trusted module 120.

The trusted module 120 enforces policy control over communications between modules by the selective distribution of encryption keys. The trusted module 120 enforces a policy ban on communications between given pairs of modules by refusing to issue keys that enable secure communications over the shared infrastructure 110 between those pairs of modules.

Figure 9:
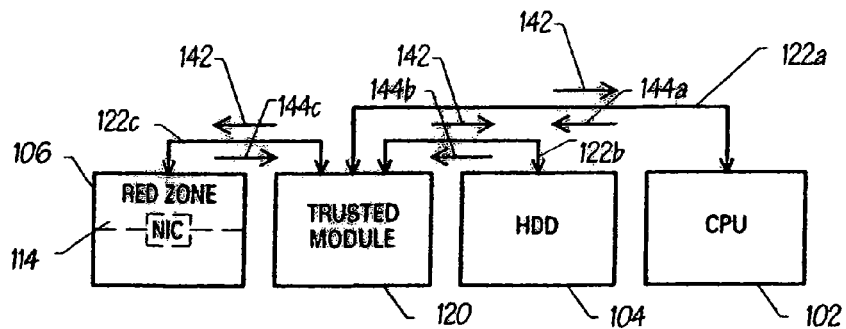
FIGS. 9 to 12 show parts of the system of FIG. 21 to illustrate various communication methods employed therein.

FIG. 9 illustrates a process by which the trusted module 120 can perform a watchdog function and 'ping' the modules 102, 104, 106 connected to the additional communication paths 122. The trusted module generates a challenge 142 and sends it to the CPU 102, hard disk drive 104 and red zone 114 of the network interface card 106 using the additional communication paths 122a,b,c, respectively. Each of the CPU 102, hard disk drive 104 and network interface card 106 responds with a response 144a,b,c, respectively, on the respective additional communication path 122a,b,c to say whether the respective module is active, and preferably that the module is acting properly. The trusted module 120 notes the responses 144a,b,c and uses them as metrics in its responses to integrity challenges that are described above with reference to FIGS. 1 to 7.

Figure 10:
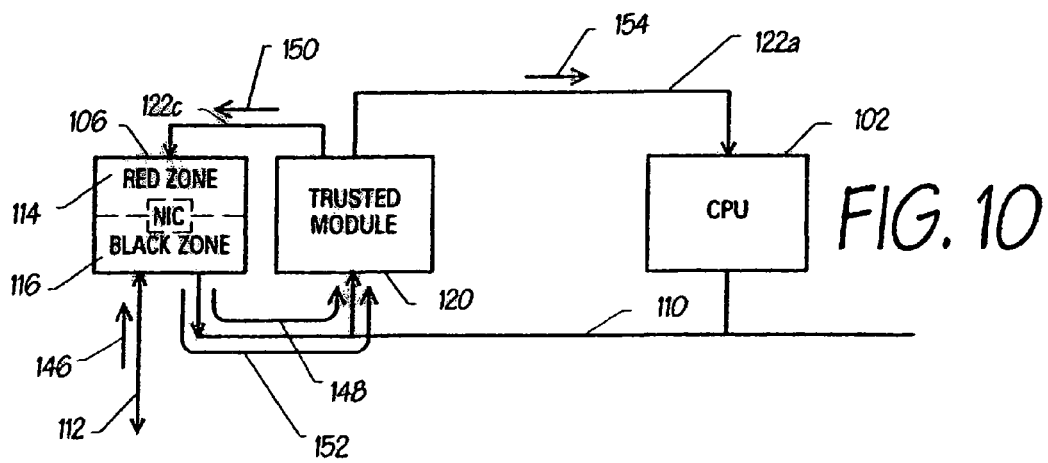

FIG. 10 illustrates the process by which incoming external secure messages are processed when the trusted module 120 is the only module in the platform with cryptographic capabilities. An external message 146 is received by the black zone 116 of the network interface card 106 using the external communication path 112. The network interface card 106 sends a protocol data unit 148 (to be described in further detail later) containing some data and a request for an authentication and integrity check to the trusted module 120 using the normal communication paths 110. The trusted module 120 performs the authentication and integrity checks using the long term keys inside the trusted module 120 that must not revealed outside the trusted module 120, and sends a protocol data unit 150 containing an 'OK' indication to the red zone 114 of the network interface card 106 using the additional communication path 122c. The network interface card 106 then sends a protocol data unit 152 containing some data and a request for decryption to the trusted module 120 using the normal communication paths 110. The trusted module 120 decrypts the data using either temporary or long term keys inside the trusted module 120, and sends a protocol data unit 154 containing the decrypted data to the CPU 102 using the additional communication path 122a. The CPU then takes appropriate action.

Figure 11:
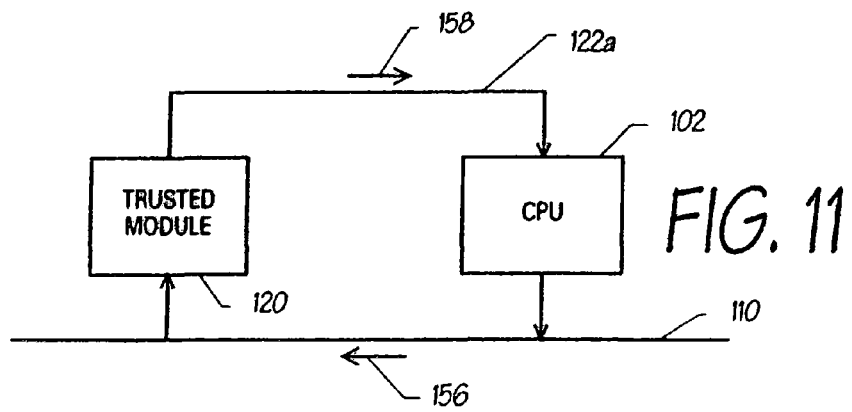

FIG. 11 illustrates the process by which the CPU 102 requests a policy decision from the trusted module 120. This could be used, for example, when the CPU 102 must determine whether policy allows certain data to be manipulated or an application to be executed. This will be described in more later with reference to FIGS. 14 to 20. The CPU 102 sends a protocol data unit 156 containing a request to the trusted module 120 using the normal communication paths 110. The trusted module 120 processes the request 156 according to the policy stored inside the trusted module 120. The trusted module 120 sends a protocol data unit 158 containing a reply to the CPU 102 using the additional communication path 122a, in order that the CPU 102 can be sure that authorisation came from the trusted module 120. If the action is authorised, the CPU 102 takes the necessary action. Otherwise, it abandons the process.

Figure 12:
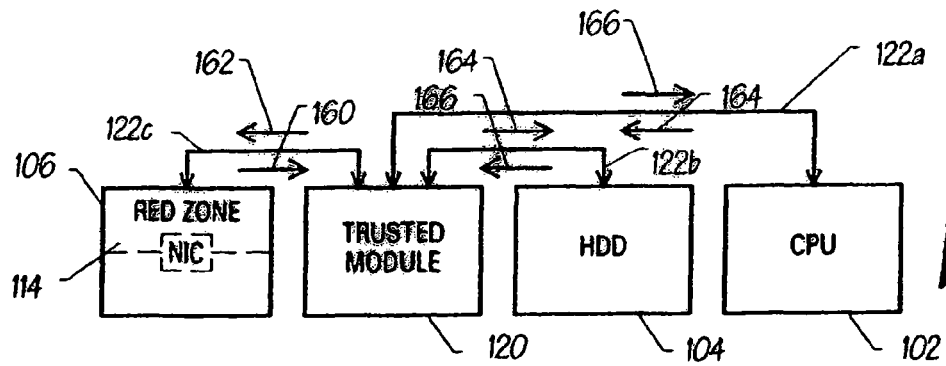

FIG. 12 illustrates an example of the control of policy over protected communications between the modules 102, 104, 106. All of the communications in this example use the additional communication paths 122. The red zone 114 of the network interface card 106 sends a protocol data unit 160 that is destined for the hard disk drive 104 to the trusted module 120 on the additional data path 122c. In the case where the policy does not permit this, the trusted module 120 denies the request by sending a protocol data unit 162 containing a denial to the network interface card 106 on the additional data path 122c. Later, the CPU 102 requests sensitive data from the hard disk drive 104 by sending a protocol data unit 164 addressed to the hard disk drive, but sent on the additional data path 122a to the trusted module 120. The trusted module 120 checks that the policy allows this. In the case where it does, the trusted module 120 relays the protocol data unit 164 to the hard disk drive 104 on the additional data path 122b. The hard disk drive 104 provides the data and sends it in a protocol data unit 166 on the additional data path 122b back to the trusted module 120 addressed to the CPU 102. The trusted module 120 checks that the policy allows this, and, in the case where it does, relays the protocol data unit 166 to the CPU 102 on the additional data path 122a.

Figure 13:
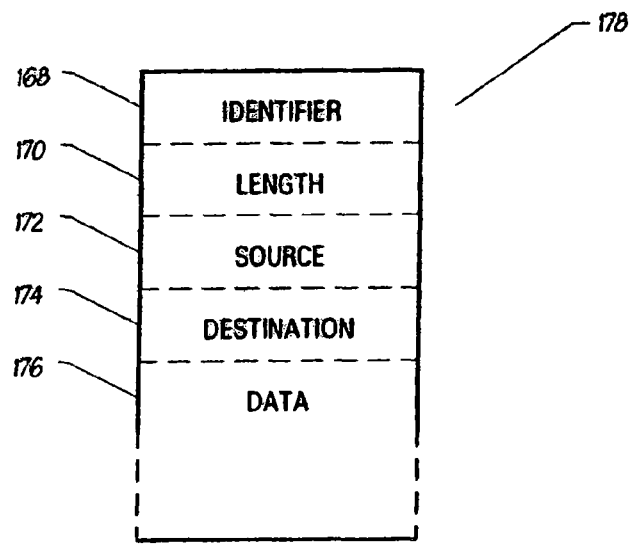
FIG. 13 illustrates the format of a protocol data unit used in the system of FIG. 21.

FIG. 13 illustrates the format of the data protocol units 178 by which data is passed over the additional communication paths 122. The data protocol unit 178 has: — an identifier field 168 indicating the type of the protocol data unit;

a length field 170 indicating the length of the protocol data unit;

a source field 172 indicating the source of the protocol data unit;

a destination field 174 indicating the destination of the protocol data unit;

and so on, including in many cases a data field 176.

Not all fields are always necessary. For example, assuming the policy of the trusted module 120 forbids it to relay key protocol data units that that did not originate within the trusted module 120, the CPU 102, hard disk drive 104 and network interface card 106 can therefore assume that keys are always from the trusted module 120. Hence, source and destination fields are unnecessary in key protocol data units—such protocol data units are implicitly authenticated. The design and construction and use, per se, of protocol data units is well known to those skilled in the art of communications.

Figure 14:
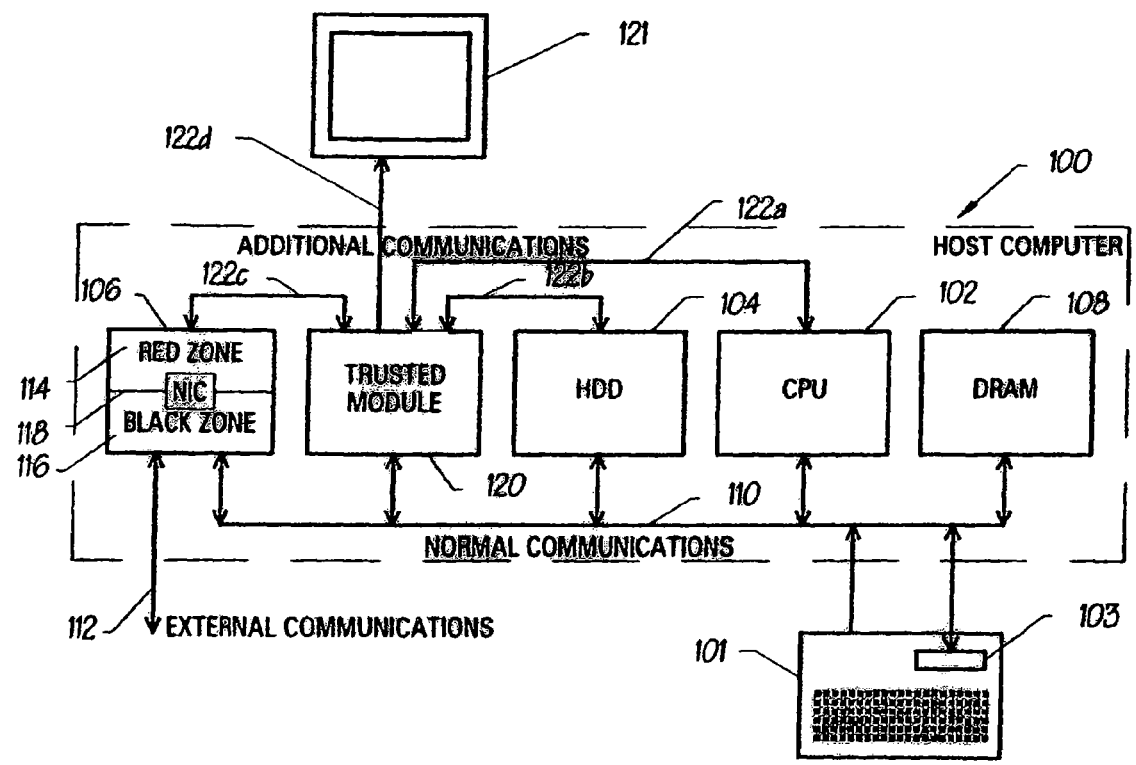
FIG. 14 shows a modification to the system of FIG. 21, which will be used to describe a specific embodiment of the present invention.

The specific embodiment of the present invention will now be described with reference to FIGS. 14 to 20. FIG. 14 illustrates the physical system and is a development of the system described above with reference to FIGS. 21 and 7 to 13. In FIG. 14, a display 121 is connected to the trusted module 120 by means of one 122d of the additional communications paths as described above. This enables the trusted module 120 to reliably write to the display, without fear of subversion from normal software, including the operating system. Also, the host computer 100 is connected to a keyboard 101 that has a built-in smart card reader 103, both of which are connected to the normal communications paths 110. A smart card which is inserted into the smart card reader 103 can be considered to be an additional trusted module and is therefore able to communicate securely with the trusted module 120.

FIG. 15 illustrates a logical diagram of the components of the trusted module 120, comprising licensing code components 200 and other licensing data components 202 within the trusted module 120. The licensing code components 200 run within a protected environment, as previously described, and preferably within the trusted module 120 itself, and comprise: a secure executor 204, a secure loader 206, secure key-transfer code 208 and a client library 210. The license-related data components 202 stored on the trusted module 120 include the private key 212 of the trusted module 120, the public key certificate 214 of a trusted entity, the clearinghouse or developer's public key certificate 216, a licensing log 218, and a hashed version 220 of the license-related code 200, signed with the private key of the trusted entity who has the public key certificate 214.

FIG. 16 illustrates the structure of protected software or data 222 within the client computer 100. Digital data 224 on the client computer 100 is associated with a respective software executor 226, within which is stored the public key 228 of the trusted module 120. This structure 230 is stored together with a hashed version 232 of it, signed with the clearinghouse or developer's private key. There will be a structure analogous to the resulting unit 222 for each piece of protected software or data.

Figure 17:
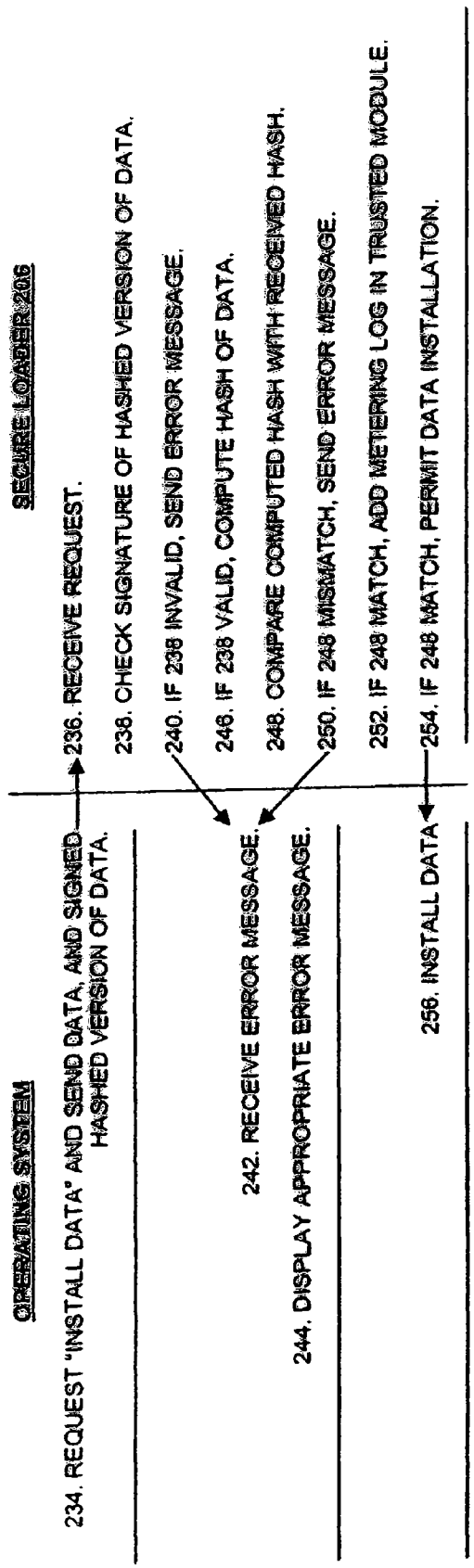
FIG. 17 is a flow chart illustrating installing or upgrading software or other data on the system of FIG. 14.

FIG. 17 illustrates the flowchart for loading or upgrading software or other data onto the client platform, for the general case where the secure loader 206 may not be running within the trusted module 120.

The data to be installed is hashed and signed with the sender's private key, and this is appended to the data itself by the sender.

In step 234, the operating system sends a request, together with the data and the signed hashed version, to the secure loader 206 that the data be installed. In step 236, the secure loader 206 receives the request, and in step 238 it checks the signature of this message, using the public key certificate corresponding to the sender, thereby checking authentication of the sender.

If authentication fails, then in step 240 the secure loader 206 sends an error message to the operating system. In step 242 the operating system receives this error message, and in step 244 displays an appropriate message.

If authentication succeeds in step 238, then in step 246 the secure loader 206 computes the hash of the message, via the cryptographic capabilities available within the trusted module 120, and in step 248 compares it to the message hash that is associated with the data and was received in step 236. This checks for integrity of the message.

If the hashes are not the same, this indicates that the data has been altered, and that it should not be installed. In this case, in step 250 the secure loader 206 sends an error message to the OS, which then performs steps 242,244 described above.

If the hashes are found to be the same in step 248, then in step 252 the trusted module 120 makes a log of the installation, and in step 254 the secure loader 206 indicates to the OS that the data can be installed as normal, which then happens in step 256.

If other forms of check (particularly license checks) are additionally or alternatively to be employed, these may be included between steps 250 and 252 in the method described with reference to FIG. 17.

Figure 18:
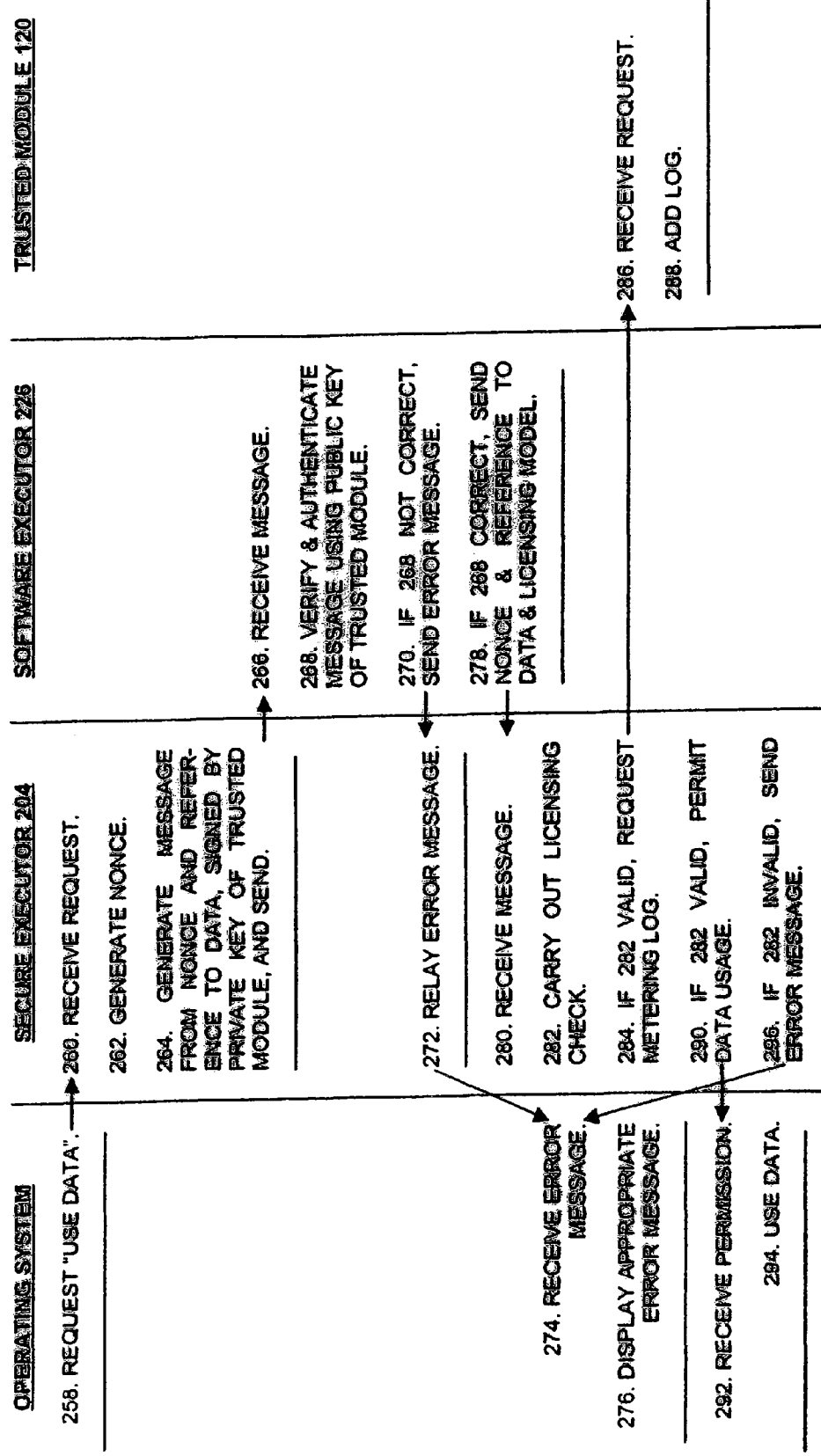
FIG. 18 is a flow chart illustrating the use of protected software or data in the system of FIG. 14 employing one model of license checking.

FIG. 18 illustrates the flowchart for licensing using a model of license checking where the OS communicates with the secure executor 204, and the software executor 226 associated with a piece of data has the option to choose the licensing model to be used for protection of that data. This again is for the general case where licensing software is not necessarily mounted within the trusted module 120. The procedure is as follows:

When the user wishes to run some digital data, in step 258 a request is sent by the operating system, which is received by the secure executor 204 in step 260. In step 262, the secure executor 206 generates a random number (nonce), and in step 264 issues a challenge/response to the software executor 226 corresponding to that piece of data, by means of sending the nonce, together with a reference to the application (e.g. its title), signed using the private key 212 of the trusted module 120.

Following receipt in step 266 by the software executor 226, in step 268 it verifies and authenticates the secure executor's challenge using the public key 228 of the trusted module 120. If there is an error, or if the software executor 226 does not wish the data to be executed on this particular machine, an error message is sent in step 270, which is relayed by the secure executor 204 in step 272 to the operating system. Following receipt of such an error message in step 274, the operating system displays an appropriate error message in step 276 and the data is not executed.

If there is no error in step 268, then in step 278 the software executor 226 returns a message to the secure executor 204 incorporating the nonce, the reference to the data and optionally a licensing model. The nonce is included to give protection against replay attacks.

Having received the message in step 280, then in step 282 the secure executor 204 makes the appropriate licensing check dependent upon the licensing model specified by the software executor. This may involve unlocking the data using a key. Further details of these licensing models are considered later. If there is no software executor associated with the data, the secure executor makes a licensing check corresponding to a default licensing model previously set within it by an administrator. If there is a valid license, in step 284 the secure executor 204 asks the trusted module 120 to takes a metering record of the transaction, steps 286,288, and in step 290 sends permission to the operating system to execute the data. Upon receipt in step 292, the operating system executes the data in step 294. Following the licensing check in step 282, if there is no valid license, in step 296 the secure executor 204 asks the operating system to notify the end-user appropriately, steps 274,276, and the data is not executed.

Figure 19:
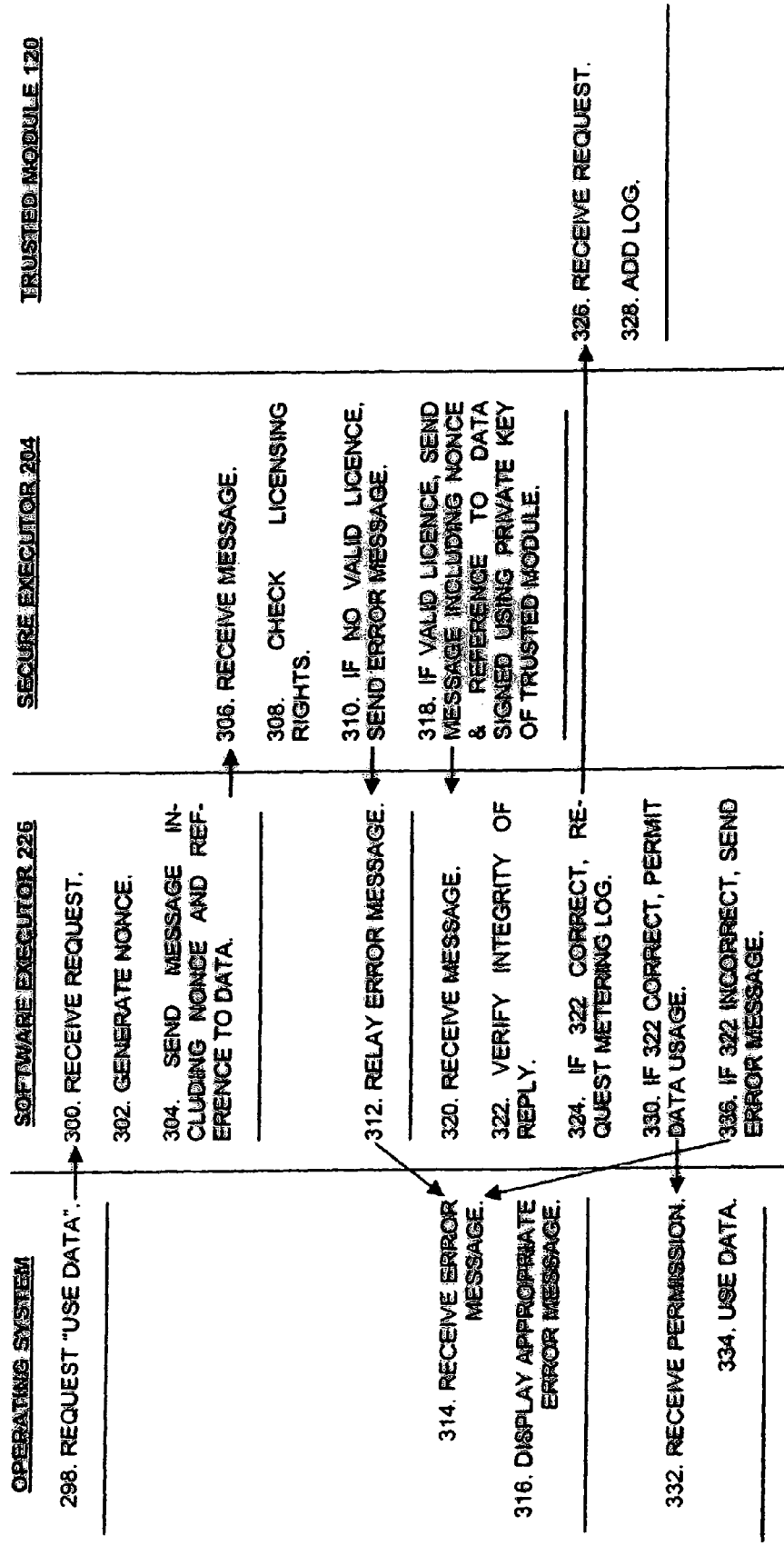
FIG. 19 is a flow chart illustrating the use of protected software or data in the system of FIG. 14 employing another model of license checking.

FIG. 19 is a flowchart for licensing using a model of license checking where the OS communicates with the software executors 226 rather than the secure executor 204. This again is for the general case where licensing software is not necessarily mounted within the trusted module 120.

When the user wishes to execute some data, in step 298 the OS sends a message to the software executor 226 associated with the data, received in step 300. In step 302, the software executor 226 generates a random number (nonce), and in step 304 issues a challenge/response to the secure executor 204 within the trusted module 120, by means of sending the nonce, together with a reference to the data. In addition, a smart card ID is sent, if that was used to log in to the client machine and hot-desking is the licensing model to be used.

Following receipt in step 306 of the message, in step 308 the secure executor 204 makes an appropriate licensing check on the data. If there is no valid license, then in step 310 the secure executor 204 returns an error message, from which the software executor could determine the exact type of problem with licensing and notifies the OS appropriately, steps 312, 314, 316.

If there is a valid license, then in step 318 the secure executor 204 returns a message incorporating the nonce and reference to the data, signed and encrypted using the private key 212 of the trusted module 120. The nonce is included to give protection against replay attacks.

Following receipt in step 320 of the message, in step 322 the software executor 226 verifies if the secure executor's reply is correct using the public key certificate 228 of the trusted module 120. If it is correct, then in step 324 the software executor 226 asks trusted module 120 makes a log, steps 326,328 and in step 330 passes the call to the OS to execute the data, steps 332,334. On the other hand, if it is not correct, in step 336 the software executor 226 sends an error message to the OS, which then displays an error message as appropriate, steps 314,316.

In a preferred mechanism for enforcing checks on permission to execute digital data, the trusted module 120 includes the hardware and/or stores the software used to implement the invention. In particular, the trusted module 120 acts as a bridge between an application and the OS. The OS preferably ignores all requests to load or run applications except those from the trusted module 120, given via a communications path 122 between the trusted module 120 and the CPU 102 that is preferably inaccessible to ordinary applications and non-OS software. The processes operating on the host computer are as follows. First, there is an initial request to the trusted module 120 to execute an application or other data, preferably via the software executor 226 associated with this data, and usually in response to some action by the end-user. The software executor 226 will contain the public key certificate 228 of the trusted module 120 on which the data is installed or to be installed. The secure executor 204 within the trusted module 120 will carry out appropriate license checking, as detailed above. If the result of this checking is that it is appropriate to execute the data, the secure executor 204 will convey this information to the OS via a communications path 122 to the CPU 102, which is preferably inaccessible to ordinary applications and non-OS software. The OS then starts a process on the host to execute the application or data. An analogous process will be carried out when the secure loader communicates with the OS to indicate that data installation is appropriate, or when the key transfer code communicates with the OS to transfer unlock keys.

Figure 20:
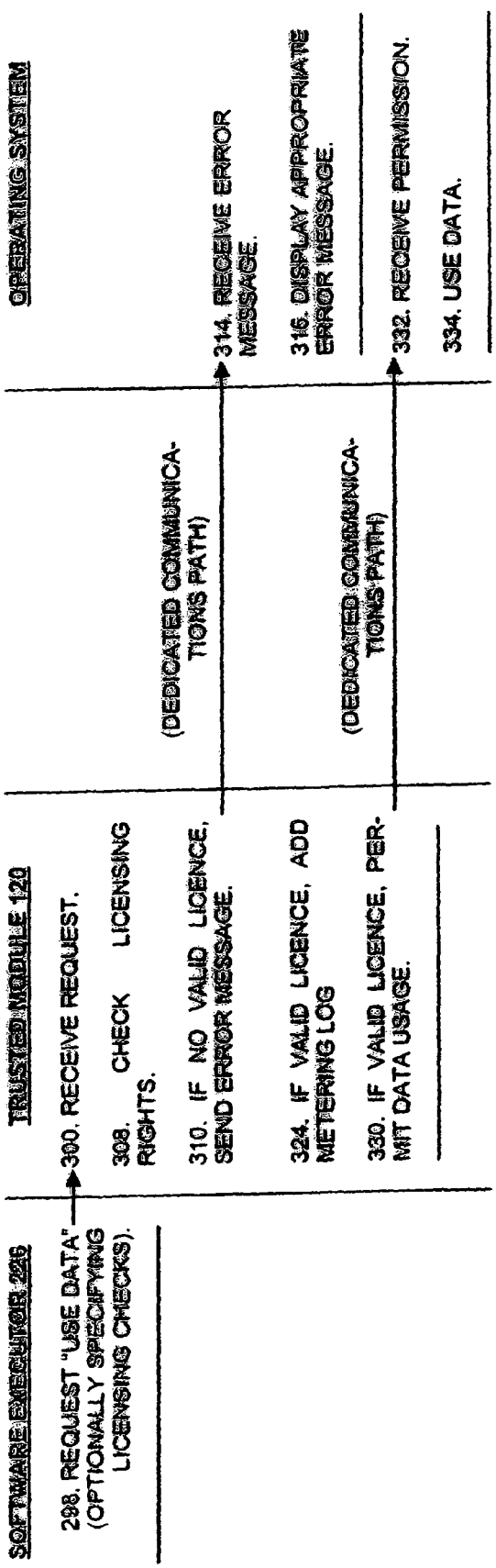
FIG. 20 is a flow chart illustrating the use of protected software or data in the system of FIG. 14 employing a further model of license checking.

FIG. 20 illustrates the flowchart for licensing using a model of license checking as mentioned above, where licensing software is stored within the trusted module 120, and the trusted module 120 acts as a bridge between an application and the OS. The process is similar to that given in FIG. 19, except that the secure executor 204 is within the trusted module 120 itself and the secure executor 120 uses a communication path 122 (preferably dedicated) from the trusted module 120 to the CPU 102 when communicating with the OS.

There are many different ways in which this invention can be used. Details of six of these will now be presented.

EXAMPLE A

A first example is to use tamper-resistant hardware as a generic dongle by binding applications to the hardware. Major differences between this example and the other examples in this section are firstly that licensing protection is carried out when the code is actually executing, and secondly that this method is suited to protection of applications for which source code is available to the party carrying out the protection mechanism.

Software is loaded into the platform (and optionally into the tamper-resistant hardware, where it would be run). The software is integrity checked using the secure loader. API calls are used to the trusted module to check for the presence of a secret in the trusted module or check for the identity and presence of the trusted module. In addition, the trusted module can be made to execute part of the code. Strong authentication of the trusted module is possible by using the trusted module's private cryptographic key, and standard authentication protocols.

In addition, there are the following options:
API calls can be made to the trusted module instead of the OS (as discussed earlier).
The trusted module can be made to execute part of the code. This can be done in several ways, some of which have already been discussed.
Part of the code could be marked for transferral into tamper-resistant hardware (such as the internal trusted module or a smart card), where it may be stored in an encrypted form, and calls made to this functionality elsewhere within the code.
Analogously, portable trusted modules such as smart cards can be made to execute part of the code.

The use of this method rather than the analogous use of API calls to a hardware dongle counters many of the disadvantages normally associated with this approach.

First, traditional software protection using API calls to a hardware dongle is vulnerable to modification of software locks via a debugger (for example, by stepping through communications between processors and the motherboard) or disassembler, thus altering the code to remove calls to the key. Modified copies of the code are produced, and run freely, both on the host machine and on other machines. This may be countered in this method by:
Part of the code being run within the trusted module itself.
Integrity checks on the platform and associated software that ensure that associated license-checking code must be loaded together with the software, and prevent license checks from being bypassed.

Secondly, there is a danger currently that record and playback (or other techniques) could be used to fill in some of the missing functionality of processing carried out on hardware. This is countered in this method by integrity checks on the software and on license-checking code.

Thirdly, there is much greater flexibility in the licensing model, both in that the license need not be tied to the machine, and in the greater choice of payment models. The trusted module provides a generic dongle that is not just tailored to a specific application and in addition provides greater capacity for licensing information storage, and better metering.

Finally, there are effort-related gains for the developer. The benefits of addition of API calls to the software are that the software is customised for a particular machine, and hence not immediately of benefit on another machine, even if the executable or source code were obtained in clear. However, it can require substantial effort on the part of the developer. By the only difference being a different trusted module ID, with protection via integrity-checking of code, substantial protection can be gained with very little effort by the developer. Again, running part of the code within the trusted module itself does not require individual customisation of code.

In this example: —

The developer can do any combination of the following:
  Insert API calls into the software, and/or into a software executor associated with the software. These will check:
    for the presence of a secret in the tamper-resistant device (e.g. if the developer has made smart card dongles and shipped these to the end users), or
    for the identity and presence of a tamper-proof device within the end-user's machine (using this as a generic dongle).
  A software executor will generally only make a check at runtime; further API calls within the code can be made at various stages during execution of the code if desired. This is done in a general way for the software (i.e. each customer will receive the same version), and customised details such as the exact trusted module ID can be added later, at the registration stage described below.
  Insert a secret into the software executor associated with the data, together with information notifying the secure executor within the computer platform that the licensing method of using a check for the presence of a secret in the trusted module or some other trusted device is to be used. For example, licensing_method (secret,sc,k,w) or licensing_method(secret,tc,k,w) indicates that the software referenced by w should only be allowed to run on a machine if the secret k is found stored within the current smart card or internal trusted component of the machine. The secure executor will have a protocol pre-stored that allows it to carry out this check, and will not allow the software w to run unless the check succeeds.

The user registers with the developer. As part of the initialisation process, authentication between communicating parties within the licensing system will take place before (or at the same time, by the protocols being incorporated) as exchange of session keys for confidentiality of messages passed between them (see example B for further details of this process). The tamper-proof component is sent public-key certificates corresponding to the developer. In return for payment (1) he is given the generally customised software, together with a portable hardware-resistant device (such as a smart card) containing (by storage or hard-coding) the developer's secret that is checked for in the code, or a key is transferred to his tamper-proof device (for example, by an analogous method to that described in more detail in example B below, except that this key is not an unlock key for decryption of the software) (2) his machine ID is inserted into the software (in order that API calls check for that particular machine ID) and the software is shipped to him.

In order to control interactions between the application and trusted module, the developer needs to ship two additional components to customers, namely the software executor and client library. The client library is a collection of high-level interface subroutines that the application calls to communicate with the software executor.

The software and the code described in the previous two stages above are signed by using a hashed version of the message signed by the sender's private key appended to the message, so that the receiver can check the integrity of the message. More explicitly, the developer hashes the code M, and signs it with his private key (Sprk) to produce the signature $$\sum_{Sprk}(h(M)).$$

Then he sends this signature together with the message M.

The secure loader will then check the signature, using the developer's public key, and therefore retrieve the message hash. This guarantees that the sender is the one whose public key has been used to check the signature. Having the message, and the message hash, the secure loader can then compute the hash of the message and compare it to the message hash it has decrypted. This checks for integrity of the message. Furthermore the integrity checking mechanism should prevent replay-attacks by some standard mechanism—such as challenge/response, or introducing a history of the communications in the hash.

If the integrity check works, the secure loader installs the software. This ensures that modified software (e.g. without API calls) cannot be run, viruses are not introduced, etc. The software can also be modified to check for the presence in the platform of the trusted module when installing.

When the user tries to run the software, the software executor takes overall control and makes initial checks at the start of the execution. If these checks are satisfied, the software executor allows the software to run. If additional API calls have been incorporated into the software, these are made to the trusted module at various points during runtime.

At the same time as such checks are made, a record is made in the trusted module if the software were executed successfully. In some models of payment the usage reports could be sent to the clearinghouse or registration body. Payment for a certain number of executions of software could easily be modelled, e.g. using smart cards.

EXAMPLE B

The second example uses the trusted module as a generic dongle by encrypting sections of, or all of, the data. Again, there is integrity checking of the data to be executed by the secure loader, and integrity checking of the secure loader, secure executor, software executor and secure transfer code. The trusted module's trusted identity (private crypto key) is used to perform strong authentication. Optionally, applications may be run within a trusted module or smart card.

The general advantage of such a licensing system is that the flexibility of license management systems can be combined with the greater degree of hardware security, without the drawbacks of dongles.

In particular, problems with current licensing systems are countered as follows:

Bypassing of licensing checks is countered by an integrity check on the platform, which will fail if the trusted device is removed or tampered with or the licensing software is altered.

A drawback of current generic methods of data protection is that, even if the data is protected up to the point of execution, once the executable is unlocked or made available for use, it can potentially be copied and used freely. Although it will still be possible to copy the data, the data cannot be executed on any other secure client platform that incorporates this invention without a requisite license.

The dongle is generic rather than tailored to specific applications.

There is flexibility in payment and licensing models (including allowing a combination of different types of licensing).

There is an improvement upon generic dongles such as Wave Systems WaveMeter in that it allows avoidance of universal system keys within the hardware device and allows the secret keys of the developer and of the hardware to remain secret. This is especially important if the third parties are non-trusted, since neither the clearinghouse, nor anyone else, will be able to make use of the protected data, since they will not know the unlock key. This is an improvement on current systems, where this key will be known by the clearinghouse.

The automated transfer of licenses between trusted modules avoids the key management problem.

Each developer has a choice of either generic or specific content protection—K (or K') can potentially be different for each customer, if desired. This gives the developer greater flexibility and allows him/her to balance effort against extra security. More generally, each type of licensing model (for example, corresponding to examples A, B or C) can be used based on the data shipped to each customer being the same, or individually customised (and hence not usable on other machines). A combination of these methods could be used on the same platform. Therefore, the choice is given to the developer about what type of data protection he would like to use. The developer just makes the unlock key, or type of generic protection, different for each customer, or the same. The client platform does not have to be informed about this choice.

In this example:

A generic secure executor, secure loader and secure key transfer code is included in every trusted computer platform. The code will not be loaded if the integrity check fails, and in this case the complete client platform integrity check should fail, as described previously in this document.

An end-user A registers his client machine (trusted device ID) with a developer, server or clearinghouse C (according to the payment model) and arranges to make appropriate payment in order to receive some data. As an alternative, the hardware device could be charged up in advance, and the data purchase recorded on this device and reported back to C at a later date.

As part of the initialisation process, authentication between communicating parties within the licensing system will take place before (or at the same time, by the protocols being incorporated) as exchange of session keys for confidentiality of the messages.

Authentication: There is authentication from C to the client's tamper-proof device. This is done using a standard protocol incorporating a challenge from A's trusted module to C containing a nonce (to give protection against replay attacks), and C responding with a message containing this nonce, digitally signed using its private code-signing key. Optionally, there is authentication from A's tamper-proof device to C. A public key certificate giving the public key W corresponding to C's private code signing key is transferred to the trusted component of the end-user (in some cases (e.g. upgrades) it will already be present in the trusted module). This is for the machine to be able to check the vendor's identity, and the integrity of the upgrade data it will receive later. If a user-based licensing model is to be used, the transfer will be to the portable trusted device (e.g. smart card). C is also given the public key corresponding to a private key P in A's tamper-proof device. This is needed for some types of authentication of A to C, and when using symmetric encryption keys set up using an asymmetric key pair (see below). In an analogous manner, public key certificates between the developer and the clearinghouse, if these are separate parties, will need to be exchanged initially and appropriate authentication carried out. The same protocols can be used as described above.

Data encrypted using a symmetric key K is signed under C's private code signing key (e.g. using Microsoft's Authenticode) and sent by C to A's machine to the end-user. K can potentially be different for each customer, if desired. This data is transferred to the end-user by any convenient means (for example, internet or satellite broadcast), since it is the unlock key that needs to be protected. An option is to use instead a private key K', since time taken to encrypt is probably not an issue at this stage.

Confidentiality: If there is a separate developer and clearinghouse, a protocol is used between the developer and the clearinghouse to set up a symmetric key pair, that can be used to encrypt communication between them, for example about payment and usage of data. By these means neither party knows the other party's secret key. The contents of each message which is to be protected are encrypted using a randomly generated DES key, and with it the symmetric key is transferred RSA-encrypted using the public key of the intended recipient. In this case too, a public key certificate corresponding to the other party will need to be installed in each party initially. If checks for authenticity and integrity are added, the following protocol results for each message: The sender generates a DES key (using a random number generator, and making sure these keys are only used once). The sender then uses it to encrypt the data D, and then encrypts that DES key using the recipient's RSA public key. Then the sender signs a hash of all this information to offer authentication and integrity, and sends the encrypted data and encrypted DES key together with this signature. Note that the sensitive data D is stored encrypted with the DES key. Only the recipient should then have the RSA private key to decrypt the DES encryption key, and use it to decrypt the data D.

All communications between A and C are encrypted using DES session keys, as discussed in the previous stage.

In addition, the symmetric unlock key corresponding to K (or, alternatively, the public key corresponding to K') is encrypted using A's public key and signed using C's private code signing key and is sent to the end-user's tamper-proof component in order to allow the data to run.

Once received by the end-user platform, an integrity check is performed by the secure loader on the data by checking the signature using W and verifying whether it is from the expected source.

If the integrity check succeeds, the data is installed on the platform and the trusted component records this event. Otherwise, an error message will be generated and the data will not be loaded The tamper-proof device associated with the end-user's PC is the only one able to make use of this information, and obtain the unlock key. The key transfer code checks the message for integrity and authentication, decrypts the unlock key and stores this on the trusted module, associated with the data.

When the user wishes to run the data, the secure executor decrypts the data using the unlock key and allows the data to run. The actual functionality of the unlock key could vary: for example, part of the program could be decrypted upon start up or installation, or the key itself could be formed using the identity of the tamper-proof component as input.

The tamper-proof component keeps a log to monitor usage of the data locally, and in a trusted fashion.

EXAMPLE C

The third example is of licensing via consulting database or profile information associated with the identity of the trusted module.

This involves updating a license database entry in return for registration and payment. There are two main options using this approach.

Example C1

The first is that the secure executor checks in a database against the trusted module ID entry for an unlock key for the data. The data is protected via encryption or partial encryption using a key, and hence can be freely distributed without fear of piracy.

Example C2

The second is that the secure executor or software executor checks in a database against the trusted module ID entry for permissions for running a piece of data. An entry corresponding to the trusted module's ID is updated to show permission to run a particular application, and the secure executor or software executor will only allow data to run once permissions on this database have been checked. In this case the data will be generic and unprotected, and can be copied freely, but of course not run on this type of platform if the requisite permissions are not in place. The trusted module will update its log if the secure executor has allowed the data to run. In the case of using a software executor to perform the checks, the software executor associated with the application to be run calls the trusted module, the trusted module performs the license check, and then if this check is successful the software executor passes the call to the OS to run the application.

The advantages of this approach are:
1) The flexibility of license management systems can be combined with the greater degree of hardware security, without the drawbacks of dongles.
2) A major motivation for using such a method would be for reasons of key management. In particular, issuing replacement passwords is troublesome. This method gets round this problem, in that it is only a database that has to be updated.
3) If directory systems are already in place, this licensing method would be a natural choice as it would not require much extra investment to provide a secure licensing check.
4) Example C1 above corresponds to another method of giving an unlock key to the client machine, as compared with example B. This could be preferred for two reasons. First, directory systems might be in place and a favoured solution for a particular corporation. Secondly, this method can allow non-permanent storage of unlock keys, allowing floating licenses, which example B does not.

A licensing procedure which could be used at present would be to check fingerprinting information against a licensing database to see whether there was a valid license corresponding to that fingerprint. The application would be allowed to run or not depending upon this information. However, this method is not really used because:

The license-checking code could at present easily be bypassed.

There is an overhead involved in generating the databases and keeping them up to date.

It is possible to spoof ID to gain access to information which is licensed to another machine or user.

However, via using a tamper-proof device in conjunction with integrity checking of the associated license-checking code, an analogous method can be used.

The method overcomes the problems associated with the existing procedure.

Directory structures can be extended to allow licensing (cf. license management)—these structures are already there, and allow integration with additional functionality. The license database could be in the form of local records stored in the trusted component, a record stored in a server (and consulted or stored locally when needed), or a centrally-maintained directory service, where appropriate information about access is stored. Indeed, a combination of these could be used. Directory standards, commonly known as X.500, provide the foundations for a multi-purpose distributed directory service that interconnects computer systems belonging to service providers, governments, and private organisations. It would be straightforward to modify such directories so that for computer network users, a look-up of a person's user ID or machine ID could return information including details of the applications licensed to that individual or machine, respectively.

There is an integrity check on license-checking code, and also on the data. Associated software on the computer platform would check if the user or machine had permission to run the application, and allow or disallow this as appropriate. Alternatively, if the data was protected, say by encryption, different data access keys could be stored in the directory, and access to them obtained in this manner, via the associated software.

Better authentication allows a directory/profile approach. Trusted ID within the trusted module (possibly combined with biometrics, if it is user ID) allows stronger authentication and helps prevent spoofing. (A more trustworthy machine or user identity makes this method less open to abuse, for example by another user's identity being given.) Keys can also be stored more securely. Optionally, software could be added to ensure that the system meters data usage, and store this within the tamper-proof device. If a smart card were used, the check in the profile would be against the user ID, single sign on would mean that the card would not have to be left within the reader, and location independence would also be gained.

With reference to the two main options of licensing using the method C given above, let us consider the first case initially, C1:

The secure executor is generic and is integrated with the platform in order to stop theft of the unlock key. This is possible because the same procedure is used with different data, and only the data name and associated key will differ in each case. The secure executor and secure loader are stored together with a hashed version signed with the manufacturer's private key. The manufacturer's public key certificate will be included in every platform. Upon boot/installation of the platform, the package is verified by hashing, and comparison with the decrypted signature to check integrity, using the public key certificate. The code will not be loaded if the integrity check fails, and in this case the complete platform integrity fails.

Upon registration of the trusted module ID and payment, the clearinghouse or developer causes the unlock key of the data K to be inserted into the database entry corresponding to the trusted module ID (this may actually be carried out by a third party, with authorisation from the clearinghouse or developer).

The public key certificate for C is installed by C into the client trusted module. A suitable protocol which would incorporate authentication from C to the trusted module would be that, in response to a request for authentication from the trusted module incorporating a nonce generated by the trusted module, C returns a message which includes its public key certificate and the nonce, signed with its private key. The trusted module can then check that the message came from C.

The software or other data to be protected is encrypted using a symmetric key corresponding to K and signed under C's private code signing key (e.g. using Microsoft's Authenticode) and sent by C to A's machine to the end-user. K can potentially be different for each customer, if desired. This data can be transferred to the end-user by any convenient means (for example, internet or satellite broadcast), since it is the unlock key that needs to be protected.

Once received by the end-user platform, an integrity check is performed by the secure loader on the data by checking the signature using the public key corresponding to C's private code signing key.

If the integrity check succeeds, the software or other data is installed on the platform and the trusted component records this event. Otherwise, an error message will be generated and the data will not be loaded.

When the user wishes to run the data, the secure executor:
checks the trusted module ID, for example by authentication involving a nonce to counter replay attacks and signed communication
checks the database entry of the trusted module ID and retrieves the unlock key K
allows the data to run, or not, as appropriate.

The tamper-proof device then updates its logs to record if the data has been run. If a user has logged in with a smart card, the userID of this device can be noted, along with the data and time.

A variation is to store the unlock key within the trusted module, once it has been retrieved, along with the data name, so that the database lookup procedure need not be carried out again for this particular data. Future requests for running the data would result in a challenge from the software executor to authenticate the trusted module ID, check the unlock key, use this to decrypt the data and allow the data to run (in the same manner as in example B above).

Now moving on to consider the second case, C2, when the secure license permissions for running a piece of data are checked for. There are two possible sub-models, depending upon whether the secure executor (a generic piece of code that is incorporated into the platform) communicates with the operating system and initiates the data execution process, or whether a (customised) software executor, shipped together with each piece of data from the clearinghouse or developer, communicates with the operating system and initiates the process. Within each, there is a choice about whether to load licensing information into the trusted module itself, or refer to an external database.

The data itself is not protected in this model. If greater confidentiality of the data is required, variants of examples A or B should be used instead.

Considering the first generic sub-model, this is very similar to that described in the key checking case of example C1.

A public key certificate corresponding to the party running the database is installed at the clearinghouse or developer, and vice versa.

Upon registration and/or payment for the data by the end-user, the clearinghouse or developer C (depending on the payment model) is told the trusted module ID.

A public key certificate corresponding to the client's trusted module is installed at the clearinghouse or developer (if not already present), and vice versa. A suitable protocol which would incorporate authentication from C to the trusted module would be that, in response to a request for authentication from the trusted module incorporating a nonce generated by the trusted module, C returns a message which includes its public key certificate and the nonce, signed with its private key. The trusted module can then check that the message came from C. An analogous protocol would be used for public key certificate transfer and authentication from the trusted module to C.

C sends the application or other data which is to be protected to the client, in the following manner: The data is signed by using a hashed version of the message signed by the sender's private key appended to the message, so that the receiver can check the integrity of the message. Explicitly, the developer hashes M, which is the data together with any associated software executor, and signs it with his private key (Sprk) to produce a signature $$\sum_{Sprk}(h(M)).$$

Then he sends this signature together with M.

The secure loader will then check the signature, using the developer's public key, and therefore retrieve the message hash. This guarantees that the developer is the one whose public key has been used to check the signature.

Having the message, and the message hash, the secure loader, via the trusted module, can then compute the hash of the message and compare it to the message hash it has decrypted. This checks for integrity of the code. Furthermore the integrity checking mechanism should prevent replay-attacks by some standard mechanism—such as using a nonce. If the integrity check works, the secure loader installs the data. This ensures that modified data (e.g. without API calls) cannot be run, viruses are not introduced, etc.

C authorises the database entry corresponding to the trusted module ID to be updated, according to the data purchased. The party running the database communicates with the clearinghouse or developer using public key cryptography setting up shared symmetric keys, and by each signing their messages. The contents of each message that is to be protected are encrypted using a randomly generated DES key, and transferred together with the symmetric key which is RSA-encrypted using the public key of the intended recipient. If checks for authenticity and integrity are added, the following protocol results for each message:

The sender generates a DES key (using a random number generator, and making sure these keys are only used once). The sender then uses it to encrypt the data D, and then encrypt that DES key using the recipient's RSA public key. Then the sender signs a hash of all this information to offer authentication and integrity, and sends everything together with this signature. Only the recipient should then have the RSA private key to decrypt the DES encryption key, and use it to decrypt the data D.

Upon a request to run a piece of data from the user, the secure executor consults the database containing licensing information to see whether permission to run the data is associated with the trusted module ID of the current platform. If it is not, an error message will be generated to the user and the data will not be allowed to run. If it is, the secure executor will ask the OS to run the data.

Considering now the second sub-model, one instantiation of the model of having a specific software executor per application would be as follows.

Upon registration and/or payment for the data, the clearinghouse or developer C (according to the exact payment model) authorises the database entry corresponding to the trusted module ID to be updated, according to the data purchased. (Prior to this, public key certificates between these bodies will have been exchanged: a suitable protocol which would incorporate authentication from C to the trusted module would be that, in response to a request for authentication from the trusted module incorporating a nonce generated by the trusted module, C returns a message which includes its public key certificate and the nonce, signed with its private key. An analogous protocol would be used for public key certificate transfer and authentication from the trusted module to C.) The party running the database communicates with the clearinghouse or developer using public key cryptography setting up shared symmetric keys, and by each signing their messages.

The clearinghouse or developer sends the data, associated with a (customised) software executor, to the client. The software executor is customised such that the public key of the trusted module is inserted into the software executor (alternatively, a shared key is set up between the secure executor and the trusted module). Both the data and the software executor are hashed and signed with the clearinghouse/developer's private key, and the public key corresponding to this is stored on the trusted module.

The secure loader integrity checks the data and the software executor: upon installation, the package is verified by hashing and comparison with the decrypted signature (using the public key in the trusted module).

The data and software executor are not loaded if the digital signature does not match what is expected.

When the user wishes to execute the data, the OS sends a message to the software executor corresponding to that data. The software executor then issues a challenge/response to the secure executor, by means of sending a random number (nonce), together with the application's title. In addition, a smart card ID is sent, if that was used to log in to the client machine and hot-desking is the licensing model to be used.

The secure executor:
  checks to see whether the data is licensed to run on the trusted module machine ID in the profile stored within the trusted module, or
  checks to see whether the data is licensed to run according to the user ID of a smart card which has been inserted in the profile stored within the trusted module, or
  consults, or downloads part of an external database to form a profile within the trusted module, to see whether the application is licensed in the manner described above.

If there is no valid license, the secure executor returns an error message, from which the software executor can determine the exact type of problem with licensing and notify the OS appropriately. If there is a valid license, the secure executor returns a message incorporating the nonce and data reference, signed and encrypted using the trusted module's private key.

The software executor verifies if the secure executor's reply is correct using the trusted module's public key, and either passes the call to the OS to execute the data or sends an error message to the OS as appropriate.

EXAMPLE D

The fourth example is of using the trusted module as a dongle by fingerprinting the trusted module.

This differs from current fingerprinting techniques in that it uses a trusted identity within the hardware (viz. the non-secret trusted module identity), integrity checking of the application to be run, integrity checking of associated application-enabling software and uses secure audit within the hardware. Optionally, an unlock key can be generated within the software executor on the client machine, rather than remotely. The trusted module will have to contact the vendor in order to obtain a key, the protected data, and the associated software executor, which will enable the decryption key to be generated locally using the trusted module ID. The data could be generically encrypted and shipped, because a single key could be used to decrypt it, or different keys could be used for each end-user (which is more secure).

This method is a variant of B, and provides an alternative to the approach used in B. It differs in that:
  The unlock key can be generated within the software executor or secure executor on the client machine rather than remotely
  The key transferred from the clearinghouse to the client machine is not the unlock key, but a key from which this can be derived using an algorithm found in the software executor, and fingerprinting details of the trusted module. It would be better to use the software executor than the secure executor, since the techniques used to derive the unlock key can vary between developers.

The flexibility of license management systems can be combined with the greater degree of hardware security, without the drawbacks of dongles. This method counters problems associated with current methods of license protection including the following:

Attacks using machines pretending to be other machines. The machine ID, which is the device ID for internal components, is trustworthy. This is useful for licensing for more secure logging, allowing greater licensing information and models, and authentication. PC fingerprints are less easy to fake than at present because device ID is more reliable than what is used at present for PC fingerprinting, i.e. hard disk ID, BIOS serial number, network ID card, etc. Such reliable identification helps against attacks using machines pretending to be other machines.

Data can be bypassed or altered, and so software-only protection is subject to a universal break. The actions taken to perform the security, fingerprinting and authentication need to be hidden from a hacker. However, because all information is stored on the PC and functions are done using the PC's processor, these actions can be traced by a debugger. The only way to safeguard these actions from a debugger is to use operating system or machine specific exceptions, like Ring Zero in Windows. While this improves security by blocking most debuggers, it does not stop chip simulators which are widely available for PC processors like Intel's Pentium. In addition, this makes the software only solution machine specific and requires a version for each of the various platforms. Many software only protection suppliers are small and cannot provide timely protection modules for all the various combinations of applications and operating environments. This leads to incompatibilities that irritate the user and cost the developer support time. Since the same authentication action must be performed on only a few identifiable PC components before any program is loaded, the hacker has relatively little code to trace; therefore, once the loading sequence is understood, the protection for all applications using the software only scheme can be easily broken. Integrity checks on the platform and software allow integrity checks on associated licensing-checking and uploading software and avoid data being bypassed or altered. The licensing aspects described are not reliant on the PC processor—the algorithm function is performed within the trusted hardware, where no debugger or chip simulator can expose the process.

A single LMF can manage all features of all of the applications sold by one developer. But there needs to be a separate arrangement with each developer, and possibly clashes between the different license managers. It would be better to have just one license manager per user site, and each developer connect into this. This model is even more general, and could cover all developers.

Software solutions give slow encryption, are less secure and can only provide a limited amount of security to stored data. Slow encryption is of limited use and makes using encryption in bulk for all communications impractical. End users can either wait longer for their communication and applications, or choose to encrypt only small pieces of the communication. Hardware encryption is faster. By using fast encryption for all communication, it can be transparent—a better solution than partial encryption. Hardware is widely recognised as being more secure because it can be encased in a tamper resistant package, and its interface can be more securely controlled. Hardware solutions allow much greater protection of sensitive data such as keys and user information.

There are two main types of use of example D.

First, in situations where a machine-based licensing model is most appropriate:
  Data S is encrypted using a key K.
  A user registers with the clearinghouse/developer C, there is mutual authentication and C is given the trusted module ID.
  C sends the encrypted data plus associated software executor to the user by any convenient means, signed and hashed.
  The secure loader on the client computer checks integrity and installs the data S if the integrity check succeeds.
  Symmetric cryptography is used to transfer the unlock key from C to the trusted module. This key will not be useful to another machine, and therefore does not need to be protected from third parties as much as in Example B, when the key transferred could be a system-level unlock key.
  The software executor calculates the decryption key corresponding to K from the unlock key and the trusted module ID, using an algorithm pre-stored within it by C or a third party trusted by C.
  The decryption key is used to decrypt the data and allow it to run.

Secondly, in situations where a user-based licensing model is required:
  Data S is encrypted using a key K.
  A user registers with the clearinghouse/developer C, there is mutual authentication and C is given the smart card ID.
  C sends the encrypted data plus associated software executor to the user by any convenient means, signed and hashed.
  The secure loader on the client computer(s) selected by the user checks integrity and installs the data S if the integrity check succeeds.
  The unlock key is transferred by any convenient means from C to the user. This key is not particularly confidential, and can be transferred by telephone or electronically.
  The user logs in to a trusted platform computer and inserts the smart card in the reader.
  When the user tries to run the data, he is prompted to type in the unlock key.
  The software executor calculates the decryption key corresponding to K from the unlock key and the smart card ID, using an algorithm pre-stored within it by C or a third party trusted by C.
  The decryption key is used to decrypt the data and allow it to run.

EXAMPLE E

There is an option to use any of the examples A-D above, but running applications suitably segmented within a trusted module: as well as running applications on the platform in a similar manner to current practice, there are additional options to run the applications within the internal machine trusted module, within a portable trusted module such as a smart card, or using a combination of any of these. State-of-the-art techniques known to an expert in the field which have been patented for running multiple applications on a smart card would be used.

EXAMPLE F

The final example is of how a combination of multiple trusted devices can be used to license data in a flexible manner. The combination of an internal machine trusted module and a portable trusted module such as a smart card is considered, for the particular case in which the hot-desking licensing model is used, and the OS communicates with the software executors. An analogous procedure would be used for the model described in FIG. 19.

Upon registration and/or payment for the data, the clearinghouse or developer (according to the exact payment model) authorises the database entry corresponding to the trusted module ID to be updated, according to the data purchased. (Prior to this, there will be mutual authentication, as described in previous examples, and public key certificates between these bodies will have been exchanged). The party running the database communicates with the clearinghouse or developer using public key cryptography setting up shared symmetric keys, and by each signing their messages. The contents of the message which is to be protected are encrypted using a randomly generated DES key, and transferred together with the symmetric key which is RSA-encrypted using the public key of the intended recipient, according to a standard protocol.

The clearinghouse or developer sends the data, associated with a (customised) software executor, to the client. The software executor is customised such that the public key of the trusted module is inserted into the software executor (alternatively, a shared key is set up between the secure executor and the trusted module). Both the data and the software executor are hashed and signed with the clearinghouse/developer's private key, and the public key corresponding to this is stored on the trusted module.

The secure loader integrity checks the data and the software executor: upon installation, the package is verified by hashing and comparison with the decrypted signature (using the public key in the trusted module).

The software executor is not loaded if the digital signature does not match what is expected.

Upon sign-on using the smart card, public key certificates of the smart card and trusted module are exchanged for future communication (if this has not already been done), and there is mutual authentication between the trusted module and the smart card.

The trusted module stores the (current) smart card ID.

When the user wishes to execute some data, the software executor corresponding to that data issues a challenge/response to the secure executor, by means of sending a random number (nonce), together with a reference to the data.

The secure executor makes an appropriate licensing check on the data, using the smart card ID, or else by obtaining some information stored on the smart card. For example, using the licensing model described above, the secure executor:

checks whether the data is licensed to run according to the user ID of the smart card which has been inserted, in the profile stored within the trusted module, or checks whether the data is licensed to run on the trusted module ID in the profile stored within the trusted module, or consults or downloads part of an external database to form a profile within the trusted module to see whether the data is licensed in the manner described above.

If there is no valid license, the secure executor returns an error message, from which the software executor can determine the exact type of problem with licensing and notify the OS appropriately. If there is a valid license, the secure executor returns a message incorporating the nonce and data reference, signed and encrypted using the trusted module's private key.

The software executor verifies if the secure executor's reply is correct using the trusted module's public key, and either passes the call to the OS to execute the data or sends an error message to the OS as appropriate.

The log is held within the machine trusted module rather than the smart card, and is updated appropriately.

It should be noted that the embodiment of the invention has been described above purely by way of example and that many modifications and developments may be made thereto within the scope of the present invention.

The invention claimed is:

1. A computer platform having:
a trusted module which is resistant to internal tampering and which stores a third party's public key certificate;
memory storing license-related code comprising at least one of a secure executor for checking whether the platform or a user thereof is licensed to use particular data and for providing an interface for using date data for monitoring its usage, and a secure loader for checking whether the platform or a user thereof is licensed to install particular data and/or for checking for data integrity before installation; and
memory storing a hashed version of the license-related code signed with the third party's private key; and
means for integrity checking the license-related code with reference to the signed version and the public key certificate and preventing the license-related code from being loaded if the integrity check fails.

2. A computer platform as claimed in claim 1, wherein the integrity checking is performed by:
reading and hashing the license-related code to produce a first hash;
reading and decrypting the signed version using the public key certificate to produce a second hash; and
comparing the first and second hashes.

3. A computer platform as claimed in claim 1, wherein the license-related code also includes a library of interface subroutines which can be called in order to communicate with the trusted module.

4. A computer platform as claimed in claim 1, wherein the license-relate code includes, for at least one group of data, a (or a respective) software executor which specifies the respective group of data and which is operable to act as an interface to that group of data.

5. A computer platform as claimed in claim 1, wherein the memory storing the license-related code the means storing the hashed version of the license-related code are provided, at least in part, by the trusted module.

6. A computer platform as claimed in claim 1, wherein the trusted module and an operating system of the platform have a dedicated communications path therebetween which is inaccessible to other parts of the computer platform.

* * * * *